United States Patent
Wang et al.

(10) Patent No.: US 11,051,161 B1
(45) Date of Patent: Jun. 29, 2021

(54) KEY MAERIAL GENERATION OPTIMIZATION FOR AUTHENTICATION AND KEY MANAGEMENT FOR APPLICATIONS

(71) Applicant: TELEFONAKTIEBOLAGET LM ERICSSON (PUBL), Stockholm (SE)

(72) Inventors: Cheng Wang, Shanghai (CN); David Castellanos Zamora, Madrid (ES); Noamen Ben Henda, Vällingby (SE); Helena Vahidi Mazinani, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/161,594

(22) Filed: Jan. 28, 2021

Related U.S. Application Data

(63) Continuation of application No. PCT/EP2021/051820, filed on Jan. 27, 2021.

(30) Foreign Application Priority Data

Feb. 20, 2020 (WO) ................ PCT/CN2020/076015

(51) Int. Cl.
  *H04L 29/06* (2006.01)
  *H04W 12/041* (2021.01)
  *H04W 12/069* (2021.01)

(52) U.S. Cl.
  CPC ....... *H04W 12/041* (2021.01); *H04W 12/069* (2021.01)

(58) Field of Classification Search
  CPC .... H04W 12/04; H04W 12/069; H04L 63/06; H04L 63/061; H04L 63/062; H04L 63/064; H04L 63/067; H04L 63/08; H04L 9/08; H04L 9/081; H04L 9/083; H04L 9/0838
  See application file for complete search history.

(56) References Cited

U.S. PATENT DOCUMENTS

| | | | |
|---|---|---|---|
| 2017/0332354 A1* | 11/2017 | Chang | H04W 72/04 |
| 2019/0089530 A1* | 3/2019 | Wu | H04L 9/0819 |
| 2019/0141523 A1* | 5/2019 | Ben Henda | H04W 36/385 |
| 2019/0268753 A1* | 8/2019 | Chen | H04L 63/205 |
| 2020/0120492 A1* | 4/2020 | Xu | H04W 12/69 |
| 2021/0014688 A1* | 1/2021 | Ito | H04W 48/18 |

FOREIGN PATENT DOCUMENTS

| WO | WO-2020151581 A1 * | 7/2020 | ............ H04W 12/04 |

OTHER PUBLICATIONS

3GPP, "5G—Authentication and Key Management for Applications (AKMA) based on 3GPP credentials in the 5G System (5GS)", Jul. 2020, TS 33.535 version 16.0.0 Release 16, pp. 1-18. (Year: 2020).*

(Continued)

*Primary Examiner* — Joseph P Hirl
*Assistant Examiner* — Chi D Nguy

(57) ABSTRACT

A method performed by a wireless device (110) includes determining whether a first message received from a network node (160) includes an Authentication and Key Management for Applications (AKMA) key indicator and, based on whether the first message includes the AKMA indicator, determining whether to generate AKMA key material for the authentication procedure with the network.

9 Claims, 21 Drawing Sheets

(56) References Cited

OTHER PUBLICATIONS

3GPP TR 33.835, V0.4.0, 3rd Generation Partnership Project; Technical Specification Group Services and System Aspects; Study on authentication and key management for applications; based on 3GPP credential in 5G (Release 16), Mar. 2019.

3GPP TS 33.535 V0.2.0, 3rd Generation Partnership Project; Technical Specification Group Services and System Aspects; Authentication and key management for applications; based on 3GPP credential in 5G (AKMA)(Release 16), Nov. 2019.

3GPP, "3rd Generation Partnership Project; Technical Specification Group Services and System Aspects; Security architecture and procedures for 5G system (Release 15)", 3GPP TS 33.501 V15.7.0, Dec. 2019.

3GPP, "3rd Generation Partnership Project; Technical Specification Group Radio Access Network; NR; Study on User Equipment (UE) power saving in NR (Release 16)", TR 38.840 V16.0.0, pp. 1-74, Jun. 1, 2019, France.

3GPP, "3rd Generation Partnership Project; Technical Specification Group Services and System Aspects; Authentication and key management for applications; based on 3GPP credential in 5G (AKMA) (Release 16)", Technical Specification, TS 33.535 V0.2.0, Nov. 2019, 11 pages.

3GPP, "3rd Generation Partnership Project; Technical Specification Group Services and System Aspects; Generic Authentication Architecture (GAA); Generic Bootstrapping Architecture (GBA) (Release 16)", TS 33.220 V16.0.0, Sep. 2019.

3GPP, "3rd Generation Partnership Project; Technical Specification Group Services and System Aspects; Procedures for the 5G System (5GS); Stage 2, (Release 16)", TS 23.502 V16.2.0, Sep. 2019.

3GPP, "3rd Generation Partnership Project; Technical Specification Group Services and System Aspects; Study on authentication and key management for applications based on 3GPP credential in 5G (Release 16)", TR 33.835, V16.0.0, Dec. 2019.

3GPP, "3rd Generation Partnership Project; Technical Specification Group Services and System Aspects; System Architecture for the 5G System; Stage 2, (Release 16)", TS 23.501 V16.0.0, Mar. 2019.

* cited by examiner

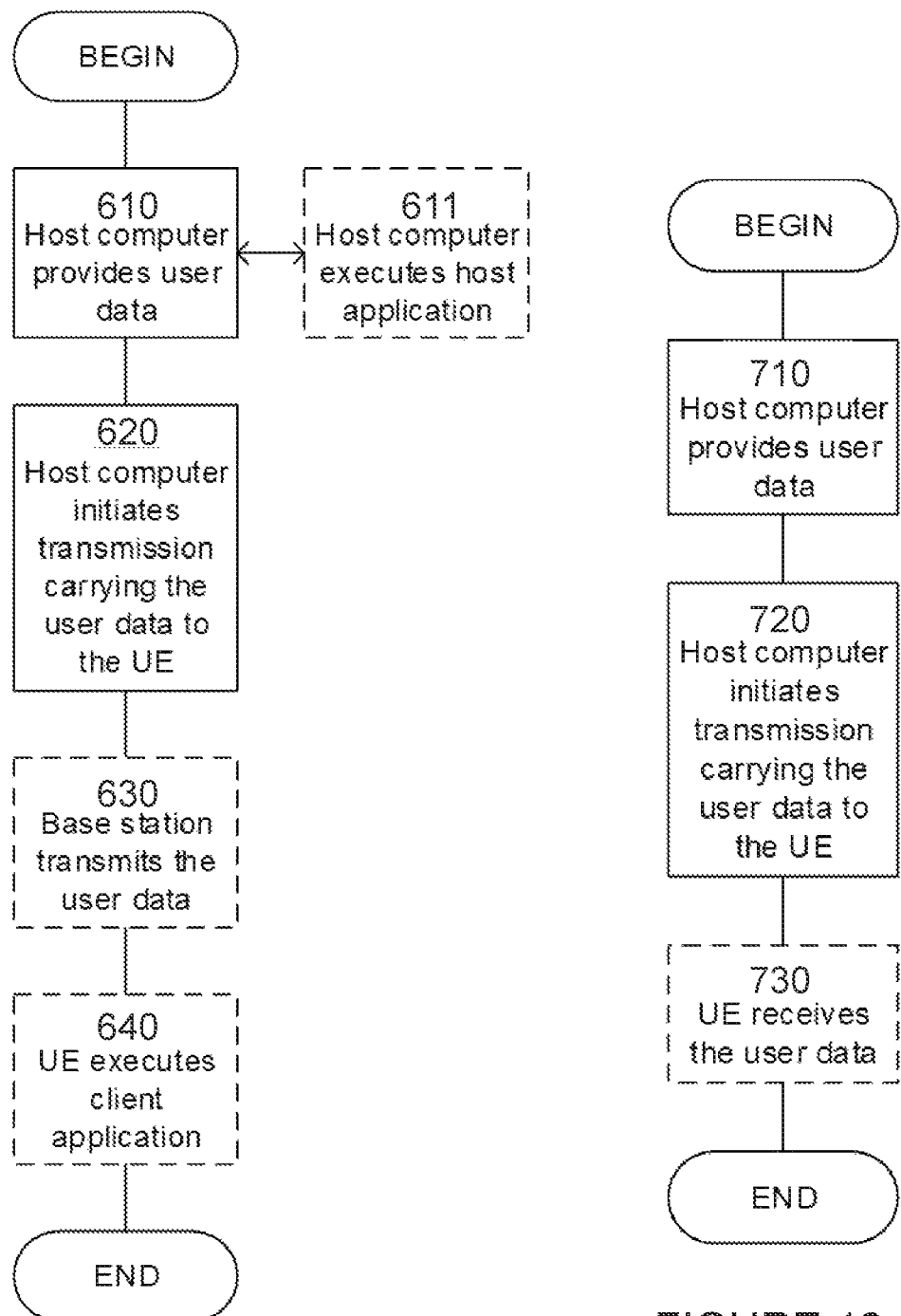

US 11,051,161 B1

KEY MAERIAL GENERATION OPTIMIZATION FOR AUTHENTICATION AND KEY MANAGEMENT FOR APPLICATIONS

CROSS REFERENCE TO RELATED APPLICATIONS

This application is a continuation of PCT International Application No. PCT/EP2021/051820, filed on Jan. 27, 2021, which claims priority to PCT International Application No. PCT/CN2020/076015, filed on Feb. 20, 2020, the disclosure and content of both of which are incorporated herein by reference in their entireties.

TECHNICAL FIELD

The present disclosure relates, in general, to wireless communications and, more particularly, systems and methods for key material generation optimization for Authentication and Key Management for Applications (AKMA).

BACKGROUND $3^{rd}$ Generation Partnership Project (3GPP) Release 16 introduced a new feature, called Authentication and Key Management for Applications (AKMA) to support authentication and key management aspects for applications and 3GPP services based on 3GPP credentials in $5^{th}$ Generation (5G), including the Internet of Things (IoT) use case. The latest TS is 3GPP TS 33.535 v. 0.2.0 with ongoing revision.

It is addressed to leverage the Authentication and Key Agreement (AKA) credentials to bootstrap security between a user equipment (UE) and an Application Function (AF), which allow the UE to securely exchange data with an application server. This may be regarded as evolution of Generic Bootstrapping Architecture (GBA) for 5G. Herein, the term AF may also be referred to as a AKMA AF.

FIG. 1 illustrates a typical network architecture for AKMA as disclosed in 3GPP TS 35.535 v. 0.2.0.

AKMA Anchor Function (AAnF) is the new logical entity introduced by AKMA. Specifically, like the Bootstrapping Server Function (BSF) in GBA, AAnF is the anchor function in the Home Public Land Mobile Network (HPLMN) for key material generation that is used between the UE and the AF. AAnF maintains UE AKMA contexts to be used for subsequent bootstrapping requests.

AKMA reuses the result of the 5G primary authentication procedure executed during the UE Registration to authenticate the UE. This is called implicit bootstrapping. In this procedure, the Authentication Server Function (AUSF) is the Network Function (NF) responsible for the generation and storage of the key material such as the $K_{AUSF}$ and $K_{AKMA}$, which are described below. As used herein, the term NF may include, as examples, the AUSF, the AAnF, the Network Exposure Function (NEF), Access and Mobility Management Function (AMF), AF, or any other network function.

FIG. 2 illustrates the AKMA key hierarchy, which includes the following keys: $K_{AUSF}$, $K_{AKMA}$, $K_{AF}$ RS disclosed in 3GPP TS 33.535 v. 0.2.0. The terms may be defined as follows:

$K_{AUSF}$: The root key as output of primary authentication procedure and stored in UE & AUSF; additionally, AUSF can report the result, and the AUSF instance that generates $K_{AUSF}$ as output of the primary authentication result in Unified Data Management (UDM), as defined in 3GPP TS 33.501 v. 16.0.0.

$K_{AKMA}$: The anchor key, which is derived by mobile equipment (ME) and AUSF from $K_{AUSF}$, and is used by AAnF for further key material generation used in AKMA; the $K_{AKMA}$ key identifier identifies the $K_{AKMA}$ key and is also a derived value.

$K_{AF}$: The AF specific key, which may also be referred to simply as the application key, is derived from $K_{AKMA}$ by ME and AAnF and is used by UE and the AKMA AF to securely exchange data.

FIG. 3 illustrates a secured session setup between a UE and an application. As depicted, a pre-requisite to the establishment of a communication session, is primary authentication and establishment of a $K_{AKMA}$ Identifier ($K_{AKMA}$ ID). Then, to initiate communication with the AKMA AF, the UE sends a session establishment request, which includes the derived $K_{AKMA}$ID in the message. The AF then requests the application specific key from AAnF by providing at least the $K_{AKMA}$ ID and the AF Identifier in the session establishment request. Further, the AAnF sends a request to the AUSF to obtain the $K_{AKMA}$ specific to the UE. The AAnF then derives the $K_{AF}$ from $K_{AKMA}$ and responds to the AKMA AF via a Key Response, which includes the $K_{AF}$, an expiration time also known as KAF_exptime and a freshness parameter used by the AAnF in order to derive a fresh $K_AF$. The AF forwards the KAF_exptime and the freshness parameter to the UE in a response message (Application Session Establishment response in FIG. 3). Optionally the AF integrity protects the response with a Message Authentication Code (MAC) calculated using the $K_AF$. The UE receives the response and uses the freshness parameter and other parameters commonly used by the AAnF in order to derive the same $K_{AF}$ as the AAnF (and the same $K_{AF}$ provided to the AF). If the response message includes a MAC, it uses the newly derived $K_{AF}$ to verify the integrity of the response message.

Secured communication is then established between the UE and the application based on the $K_{AF}$.

Before starting normative specification work, AKMA was studied in 3GPP TR 33.835 v. 16.0.0, which recommended to use the idea of solution #15, #19 and #23 of implicit bootstrapping as the basis of AKMA authentication procedure. In details, reusing $K_{AUSF}$ (as described in solution #19, #23 and the child option in solution #15) is recommended to be the basis of normative work.

Solution #15 in 3GPP TR 33.835 v. 16.0.0 also includes, as a possible impact on Unified Data Management (UDM), the following aspects:

New parameter keeping track of AKMA key is to be derived by AUSF

Potentially communicate AKMA usage to AUSF and UE (unless it is statically configured)

Finally, the details on whether the AKMA keys are generated on-demand (when required by an AAnF) versus pre-generated key (right after the execution of each primary authentication) are left to normative work. 3GPP TS 33.535 v. 0.2.0 does not yet cover this area.

Generic Bootstrapping Architecture (GBA)

GBA is introduced in 3GPP TS 33.220 v. 16.0.0, to bootstrap authentication and key agreement for application security such as, for example, to enable application functions in the network and on the user side to establish shared keys.

FIG. 4 illustrates a simple network model for GBA.

Mutual authentication is performed between the UE and the BSF. The bootstrapping key material are derived between the UE and BSF, accordingly. Also, a Bootstrapping Transaction Identifier (B-TID) is generated by BSF. The B-TID provides reference the bootstrapping transaction and the GBA key material derived thereof. The bootstrapped GBA key material is used further for protecting the access to network application functions (NAF) from UE.

When the UE initiates communication with the application function, it includes the B-TID in the message. The Application function then requests the application specific key from BSF with B-TID as input. Further BSF locates GBA key material corresponding to B-TID from which BSF derive the AF specific key and responds to the AF.

The secured communication is then enabled between UE and the application based on the AF specific key.

UE Parameters Update Via UDM Control Plane Procedure

UE Parameters Update via UDM Control Plane Procedure (called UPU for brevity in this document) is a feature introduced in 3GPP TS 23.502 v. 16,2,0 to support the delivery of UE Parameters Update Data from the UDM to the UE via NAS signalling after the UE has successfully registered to the 5G network.

The UDM Update Data that the UDM delivers to the UE may contain:
- one or more UE parameters including:
  - the updated Default Configured NSSAI (final consumer of the parameter is the ME).
  - the updated Routing Indicator Data (final consumer of the parameter is the Universal Subscriber Identity Module (USIM)).
- a "UE acknowledgement requested" indication.
- a "re-registration requested" indication.

FIG. 5 illustrates the UPU procedure as disclosed in 3GPP TS 23.502 v. 16.2.0. Note, there is another feature called "Steering of roaming security mechanism" defined in 3GPP TS 33.501 v. 16.2.0 to support similar function of information delivery (i.e. Steering Information List) from HPLMN to UE.

Certain problems exist. For example, as mentioned above, AKMA is based on an implicit bootstrapping of the security between UE and network. More precisely, it reuses the result of 5G primary authentication procedure executed during the UE Registration to generate key material used for AKMA procedure. This implies that the AKMA procedure generates new AKMA key material for each and every primary authentication procedure, even if the AKMA feature is not required for UE or AF. On the other hand, looking back at GBA, the key material is only generated on-demand, i.e. based on the request either from UE or from AF. As such, the key material generation procedure in AKMA is inefficient when compared to how it is done in GBA. This is a waste of resources. For example, it may be a waste of computing and storage resource in UE and network. This may be especially true for those UEs which are not allowed or do not need to use AKMA.

SUMMARY

Certain aspects of the present disclosure and their embodiments may provide solutions to these or other challenges. For example, according to certain embodiments, methods and systems are provided that include use of subscription data to control the AKMA key generation. More specifically, certain embodiments may optimize the generation of AKMA key material in the AUSF and the UE only when subscription information in UDM authorizes it and/or only when it needs to be used such as, for example, on-demand. As such, certain embodiments may avoid unnecessary key material generation for AKMA implicit bootstrapping.

According to certain embodiments, a method by a network node operating as a UDM node includes receiving a first message associated with an authentication request message of a wireless device. Based on subscription information associated with the wireless device, the network node generates a second message comprising an authentication response message. The second message includes an AKMA key indicator to trigger the wireless device to generate AKMA key material. The network node transmits the second message comprising the authentication response message to trigger the wireless device to generate the AKMA key material.

According to certain embodiments, a method performed by a first network node operating as an AUSF includes determining whether a first message received from a second network node includes an AKMA key indicator. Based on whether the first message includes the AKMA indicator, the first network node determines whether to generate AKMA key material.

According to certain embodiments, a method performed by a wireless device includes generating an Authentication and Key Management for Applications Anchor Key ($K_{AKMA}$) in response to determining a need to initiate a communication session with an AF. The wireless devices transmits, to the AF, a request to initiate the communication session.

According to certain embodiments, a network node operating as a UDM node includes processing circuitry configured to receive a first message associated with an authentication request message of a wireless device. Based on subscription information associated with the wireless device, the processing circuitry is configured to generate a second message comprising an authentication response message. The second message includes an AKMA key indicator to trigger the wireless device to generate AKMA key material. The processing circuitry is configured to transmit the second message comprising the authentication response message to trigger the wireless device to generate the AKMA key material.

According to certain embodiments, a first network node operating as an AUSF includes processing circuitry configured to determine whether a first message received from a second network node includes an AKMA key indicator. The processing circuitry is configured to determine whether to generate AKMA key material based on whether the first message includes the AKMA indicator.

According to certain embodiments, a wireless device includes processing circuitry configured to generate a $K_{AKMA}$ in response to determining a need to initiate a communication session with an AF. The processing circuitry is configured to transmit, to the AF, a request to initiate the communication session.

Certain embodiments may provide one or more of the following technical advantages. For example, one technical advantage may be that certain embodiments enable a flexible setting on AKMA key material generation. As another example, another technical advantage may be that certain embodiments avoid the unnecessary generation of AKMA keys. As still another example, a technical advantage may be that certain embodiments provide the mean to handle upgraded UEs such as, for example, UEs supporting the AKMA feature and legacy UEs.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 15 illustrates a method implemented in a communication system, according to one embodiment;

FIG. 16 illustrates another method implemented in a communication system, according to one embodiment;

DETAILED DESCRIPTION

Figure 1:
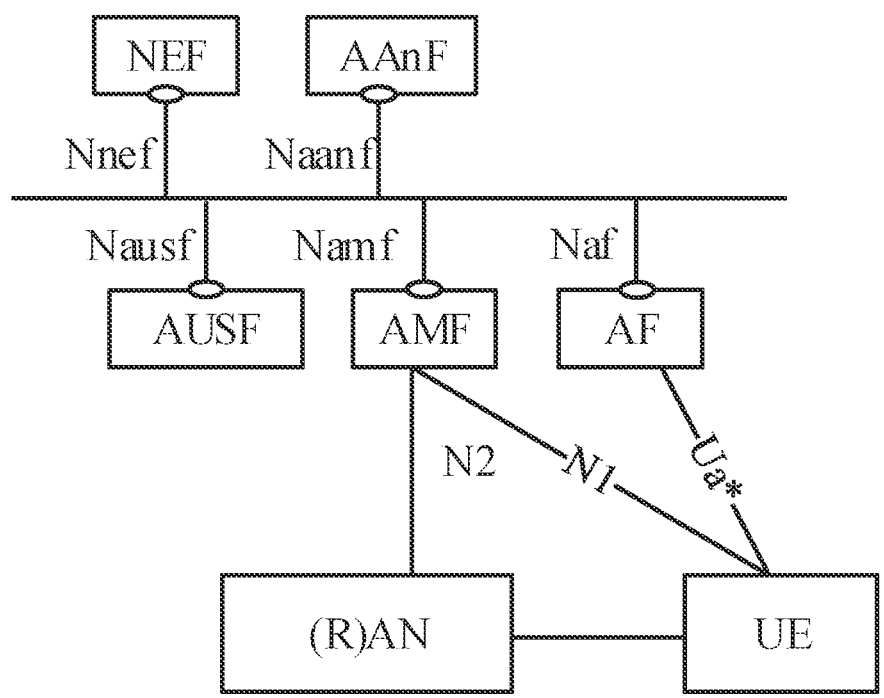
FIG. 1 illustrates a typical network architecture for Authentication and Key Management for Applications (AKMA)
Figure 2:
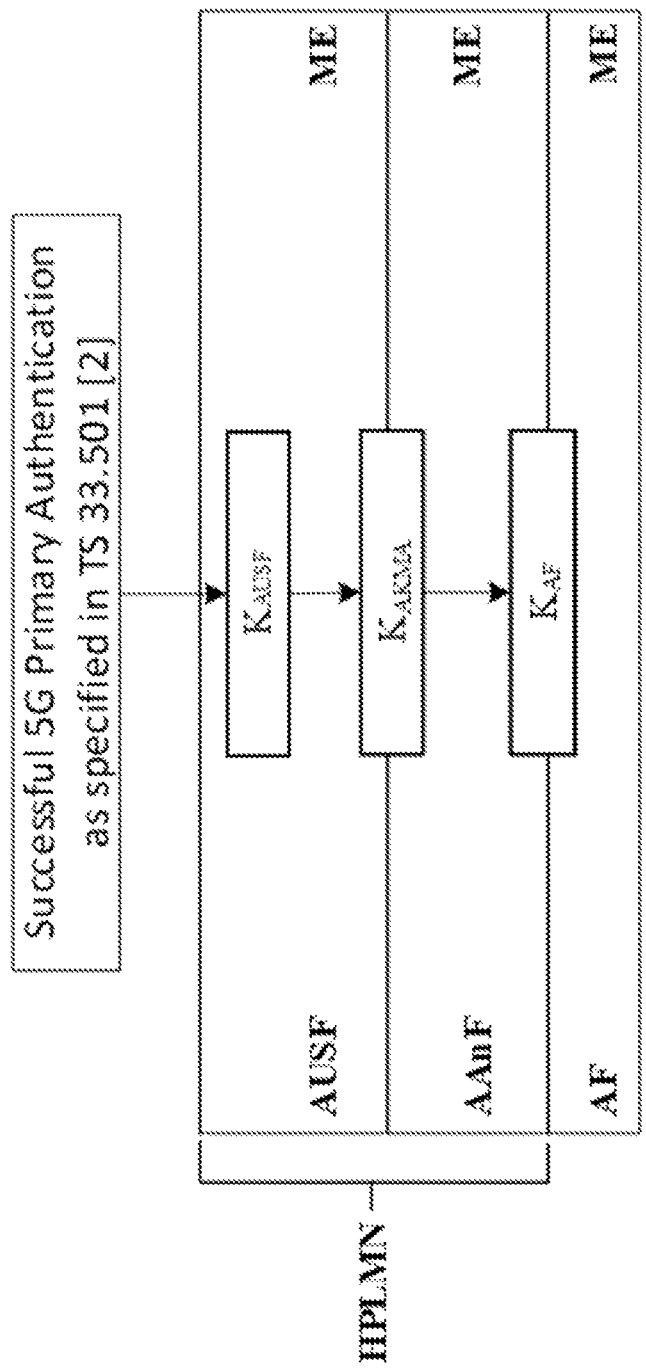
FIG. 2 illustrates the AKMA key hierarchy.
Figure 3:
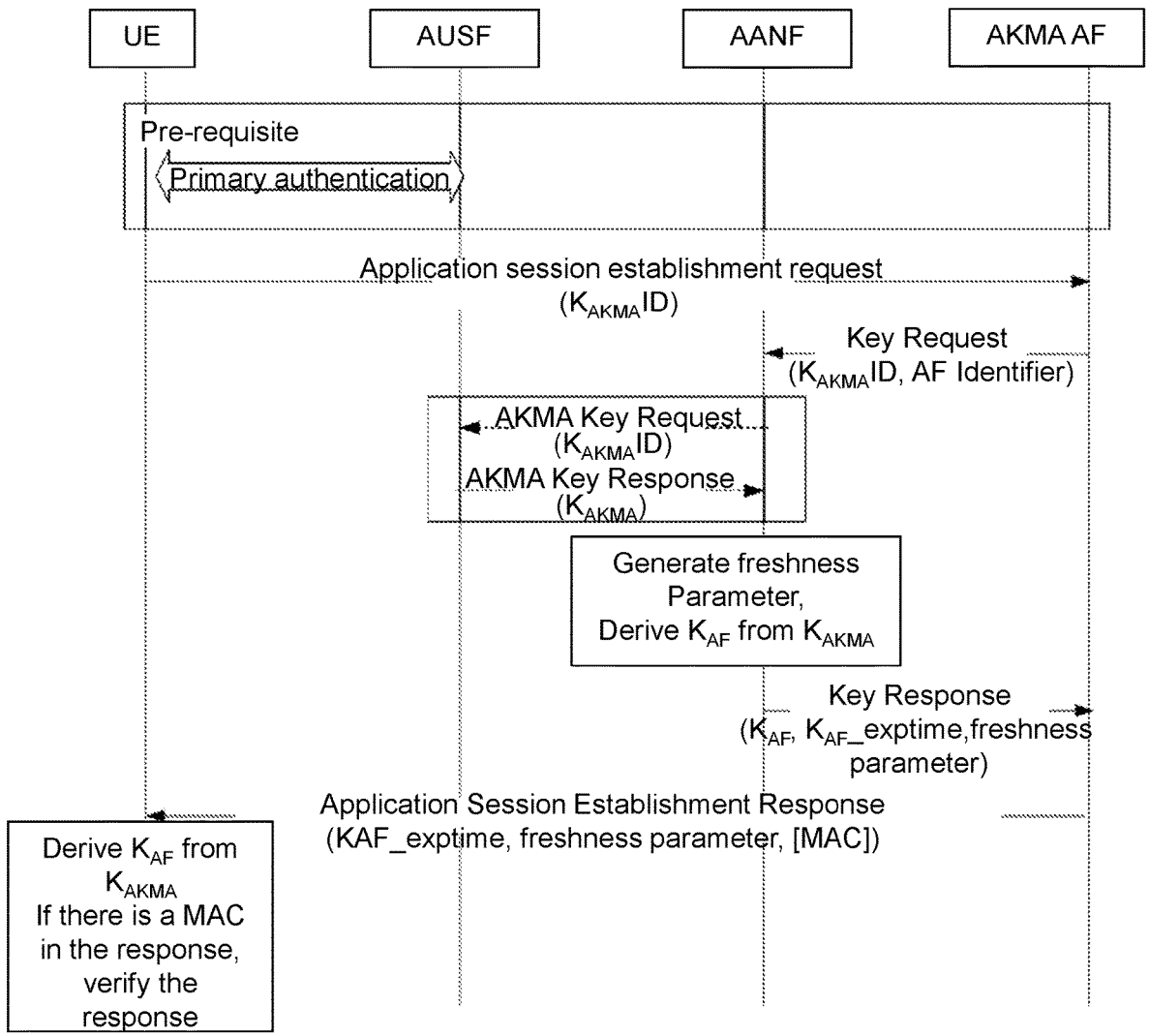
FIG. 3 illustrates a secured session setup between a user equipment (UE) and an application.
Figure 4:
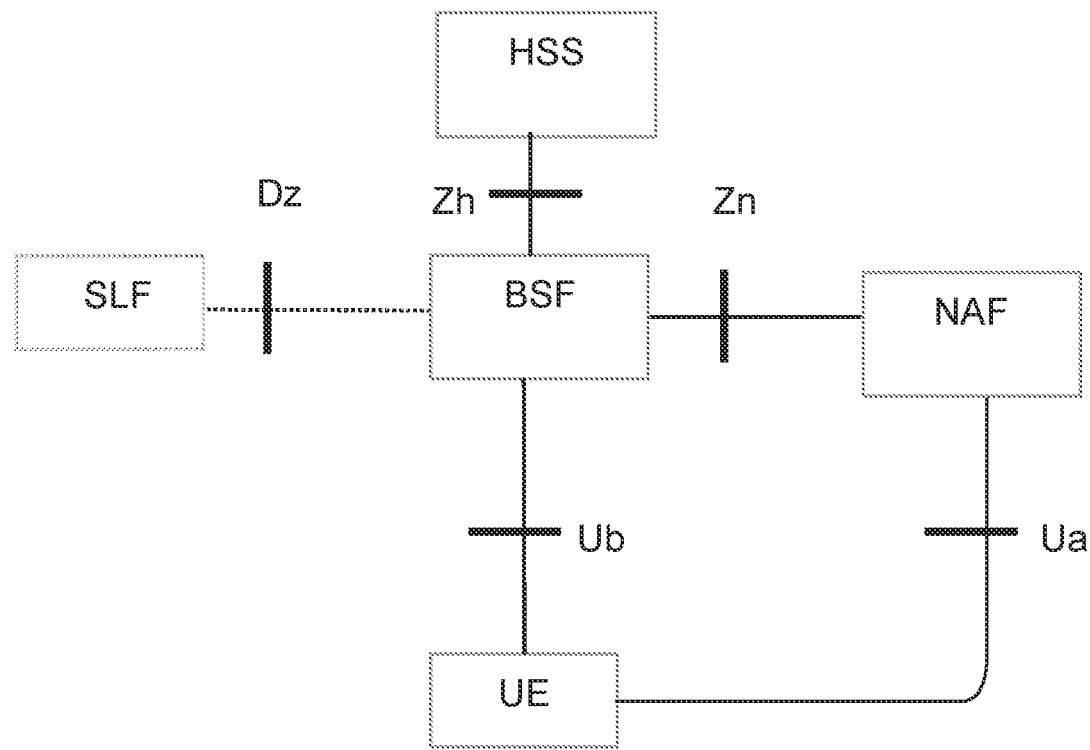
FIG. 4 illustrates a simple network model for Generic Bootstrapping Architecture (GBA)
Figure 5:
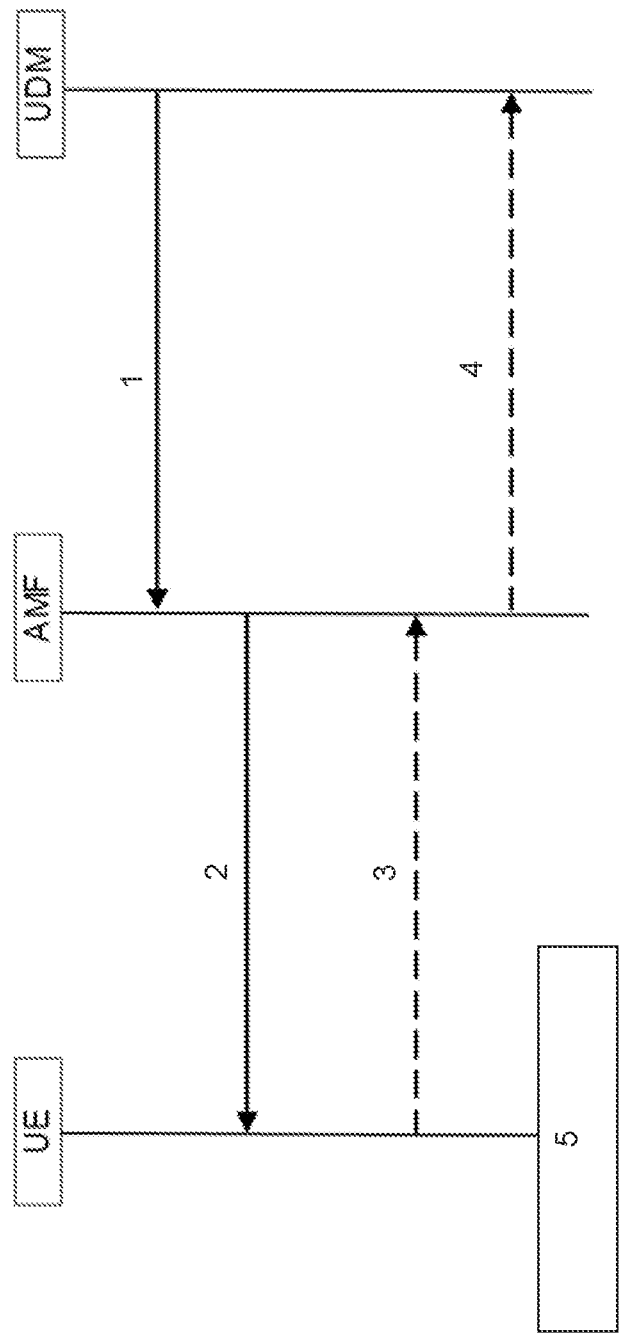
FIG. 5 illustrates the Unified Data Management Control Plane Procedure (UPU procedure)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNodeB (MeNB), eNodeB (eNB), a network node belonging to Master Cell Group (MCG) or Secondary Cell Group (SCG), base station (BS), multi-standard radio (MSR) radio node such as MSR BS, gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations & Maintenance (O&M), Operations Support System (OSS), Self-Optimizing Network (SON), positioning node (e.g. Evolved-Serving Mobile Location Center (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, methods and systems are provided that include use of subscription data to control the AKMA key generation. More specifically, certain embodiments may optimize the generation of AKMA key material in the AUSF and the UE only when subscription information in UDM authorizes it and/or only when it needs to be used such as, for example, on-demand. As such, certain embodiments may avoid unnecessary key material generation for AKMA implicit bootstrapping.

Generation of AKMA Key Material Based on Subscription Information

Figure 6:
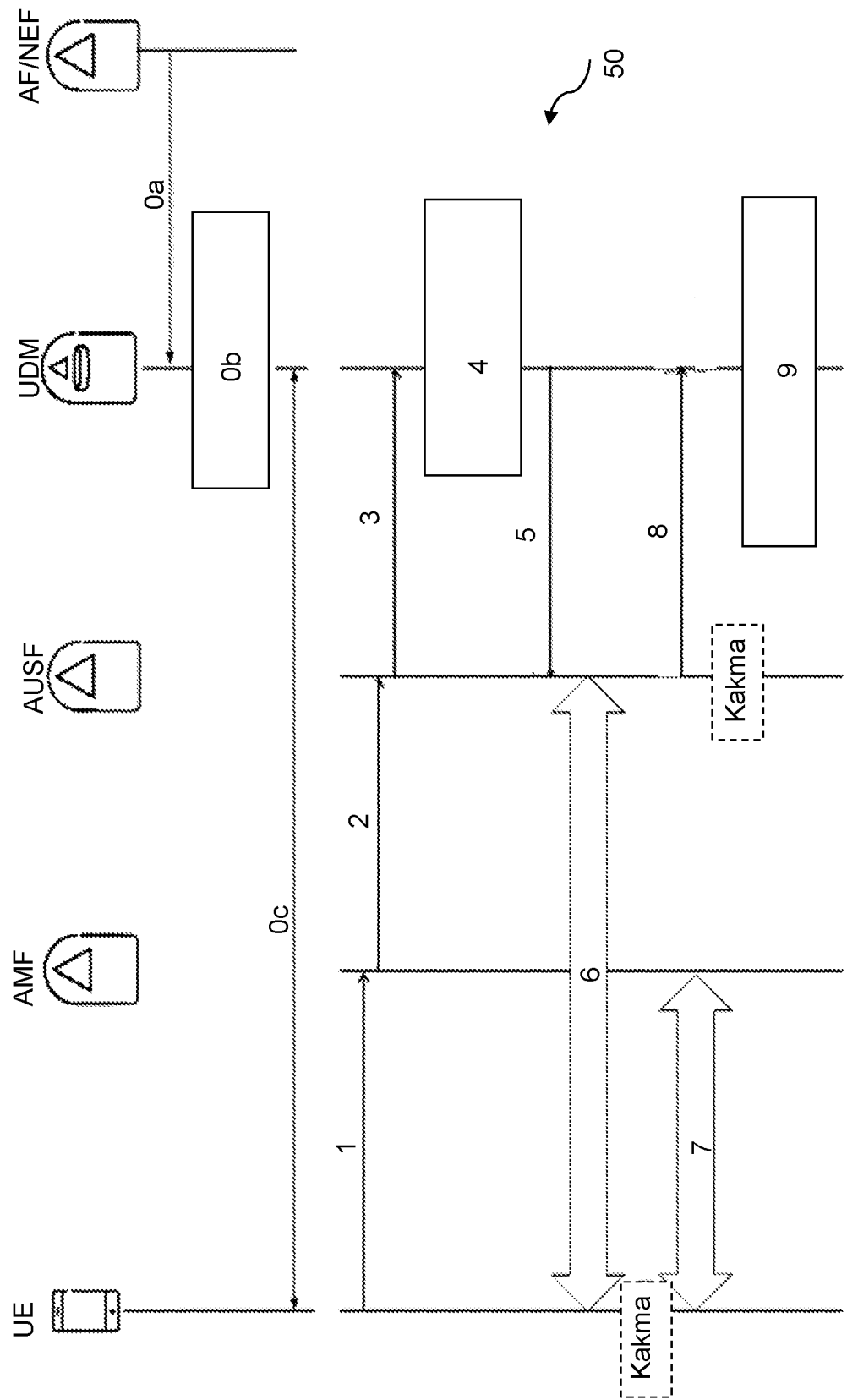
FIG. 6 illustrates AKMA key material generated based on subscription information, according to certain embodiments.

FIG. 6 illustrates a signalling diagram 50 for AKMA key material generated based on subscription information, according to certain embodiments. In the depicted example, the steps for AKMA key material generation based on subscription information may include the following:

0. Mobile Network Operator (MNO) set AKMA key material generation flag in UE's subscription data, e.g., by using an Operations & Management (O&M) system; Optionally, this flag can be provided by $3^{rd}$ party AF via existing Nudm_ParameterProvision service.

UDM determines based on MNO policy to update this flag in UE, e.g. via existing UPU procedure or other similar procedure (e.g. as part of the NAS signaling during primary authentication exchange, as proposed in steps 6-7 below).

A default or configured value of this flag exists in UE and in UDM's subscription data, if it is not updated by the mentioned method above.

1-3. UE initiates authentication procedure with the network, as per defined in 3GPP TS 33.501 v. 16.0.0.

4. Upon receiving the request for authentication vector, e.g. Nudm_UEAuthentication_Get, UDM prepares authentication vector as defined in 3GPP TS 33.501 v. 16.0.0.

Meanwhile, based on subscription data of AKMA key material generation flag, UDM determines whether AKMA key material needs to be generated.

5. UDM response authentication vector back via Nudm_UEAuthentication_Get response, together with the AKMA key indication included in the message.

6-7. Authentication & AS/NAS security procedure proceed as defined in 3GPP TS 33.501 v. 16.0.0.

AUSF may optionally include the AKMA indicator piggy backed over the authentication signaling procedure with the UE.

UE generates key material for the authentication procedure. Meanwhile based on the AKMA key material generation flag stored in UE (or received via authentication procedure), the UE generates the key material for AKMA, e.g. $K_{AKMA}$, $K_{AKMA}ID$.

8-9. AUSF receives authentication result and calls the existing service operation Nudm_UEAuthentication_ResultConfirmation to inform UDM about authentication result.

Based on the AKMA key material generation flag stored in AUSF and/or received from UDM, AUSF generates the key material for AKMA, e.g. $K_{AKMA}$, $K_{AKMA}ID$.

UE and AUSF then both generate the key mUaterial for AKMA and fulfil implicit

Generation of AKMA Key Material on Demand

According to certain other embodiments, the management of the AKMA support indication may be realized in a dynamic fashion or on-demand. For example, the network (including the AF and the Core elements such as, for example, the UDM and AUSF) does not need to be pre-provisioned with such UE specific information. This may be because the fact that the UE supports the AKMA feature can be inferred from the initiation of the AKMA procedure by the UE towards an AF, according to certain embodiments. A UE not supporting AKMA will not initiate any such procedure.

Figure 7:
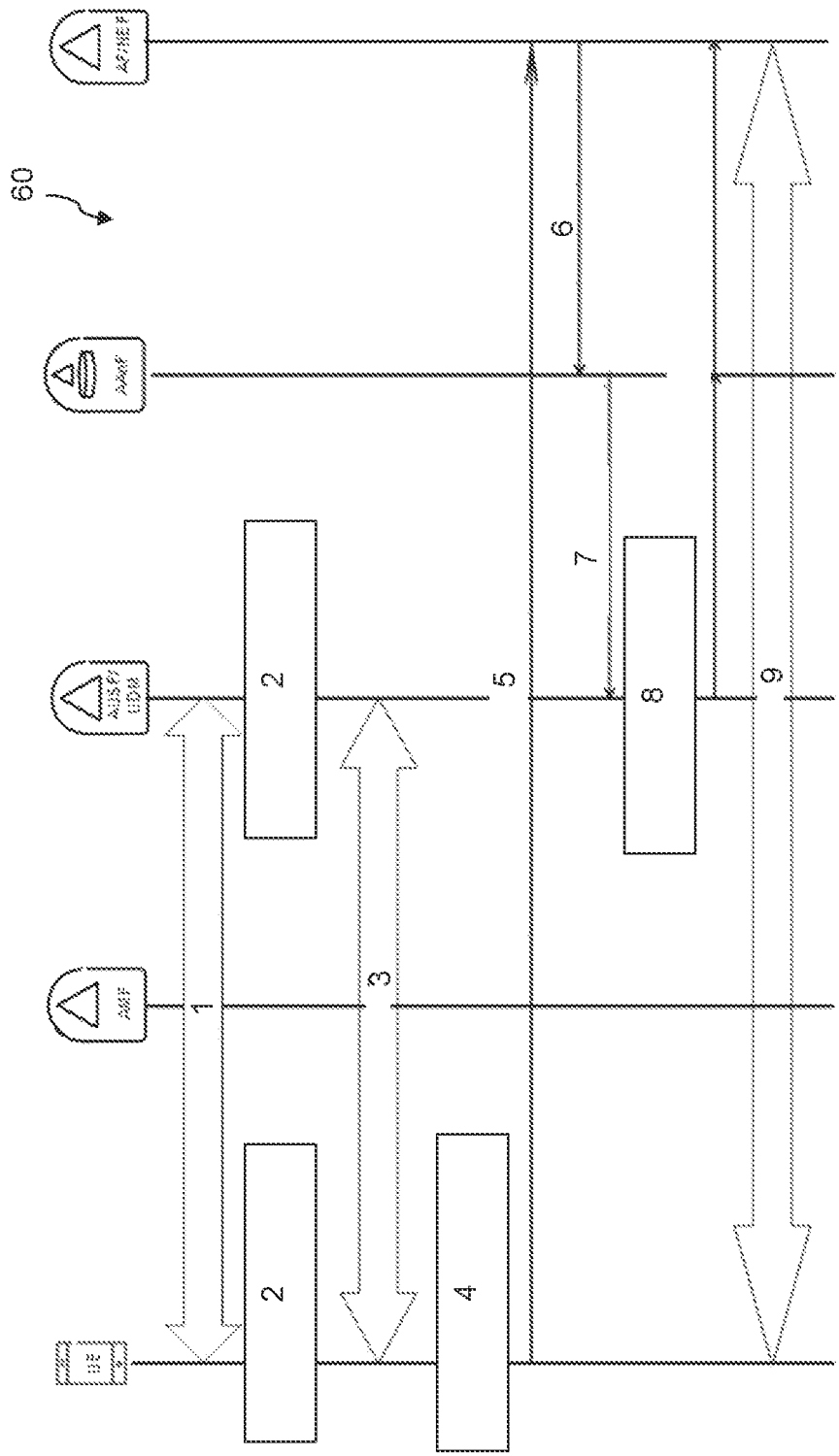
FIG. 7 illustrates key material generated on demand, according to certain embodiments.

FIG. 7 illustrates a signalling diagram 60 for key material generated on demand, according to certain embodiments. Certain of the steps may be similar to those shown in FIG. 6.

As depicted, according to certain embodiments, the UE and the AUSF may not pre-generate AKMA key material after the primary authentication procedure (step 2). Rather, before the initiation of an application session establishment with an AF, which requires AKMA keys, the UE generates the $K_{AKMA}$ and $K_{AKMA}ID$ on-demand (step 4).

The UE will request a session establishment to the AF using the generated $K_{AKMA}ID$ (step 5). Then the AF will send a request for an AF key to the AAnF (step 6), which in turn will send a request for the corresponding AKMA Key to the AUSF (step 7).

Upon the reception of an AKMA key request, the AUSF generates the corresponding $K_{AKMA}$ on demand (step 8).

According to certain embodiments, in this scenario, the AAnF and the AUSF may require additional information such as, for example, a UE id to select the AUSF and to generate the AKMA key material for the particular UE. One of ordinary skill in the art may recognize that different types of UE id, SUPI/SUCI or GPSI and/or other types of additional information may be provided by the UE to assist in this process.

After the generation of the $K_{AKMA}$ on demand, the AKMA procedure is completed as at steps 9-10, which may be similar to those disclosed above.

According to certain embodiments, the on-demand approach described with regard to FIG. 7 may be combined with the generation of AKMA key material based on subscription information, which is described above with regard to FIG. 6. For example, when the AAnF requests the AKMA key to the AUSF at step 7 in FIG. 7, the UDM may determine and/or authorize whether the UE is allowed to use AKMA services. This can be done via a query to UDM from AUSF or from AAnF directly.

According to certain embodiments, the AF/NEF may trigger the UDM parameter provisioning procedure of step 0*a* including the indication that the UE supports AKMA. In this case step 0*c* in FIG. 6 may be skipped. Alternatively, the AF/NEF may not provide any additional indication, but the indication may be set in the UDM by the AAnF using the same procedure as in step 0*a* in FIG. 6 upon receiving a key request from an AF. In yet another particular embodiment, the AAnF may not set the indication but rather the AUSF may set the indication.

Figure 8:
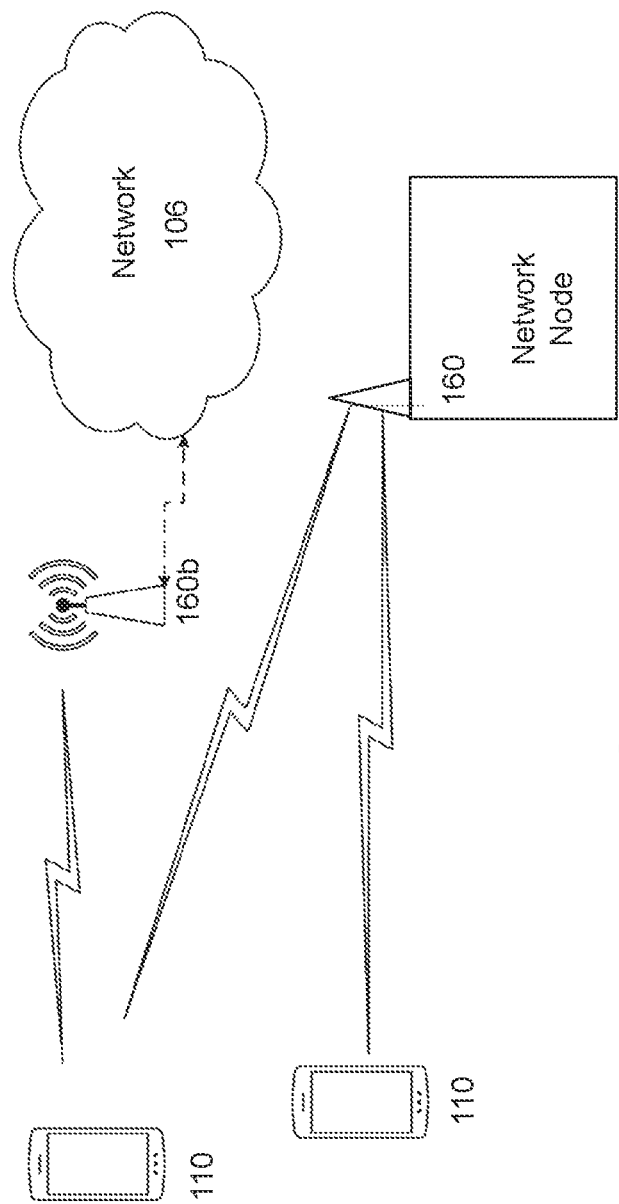
FIG. 8 illustrates an example wireless network, according to certain embodiments.

FIG. 8 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (Wireless Local Area Network (WLAN)) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
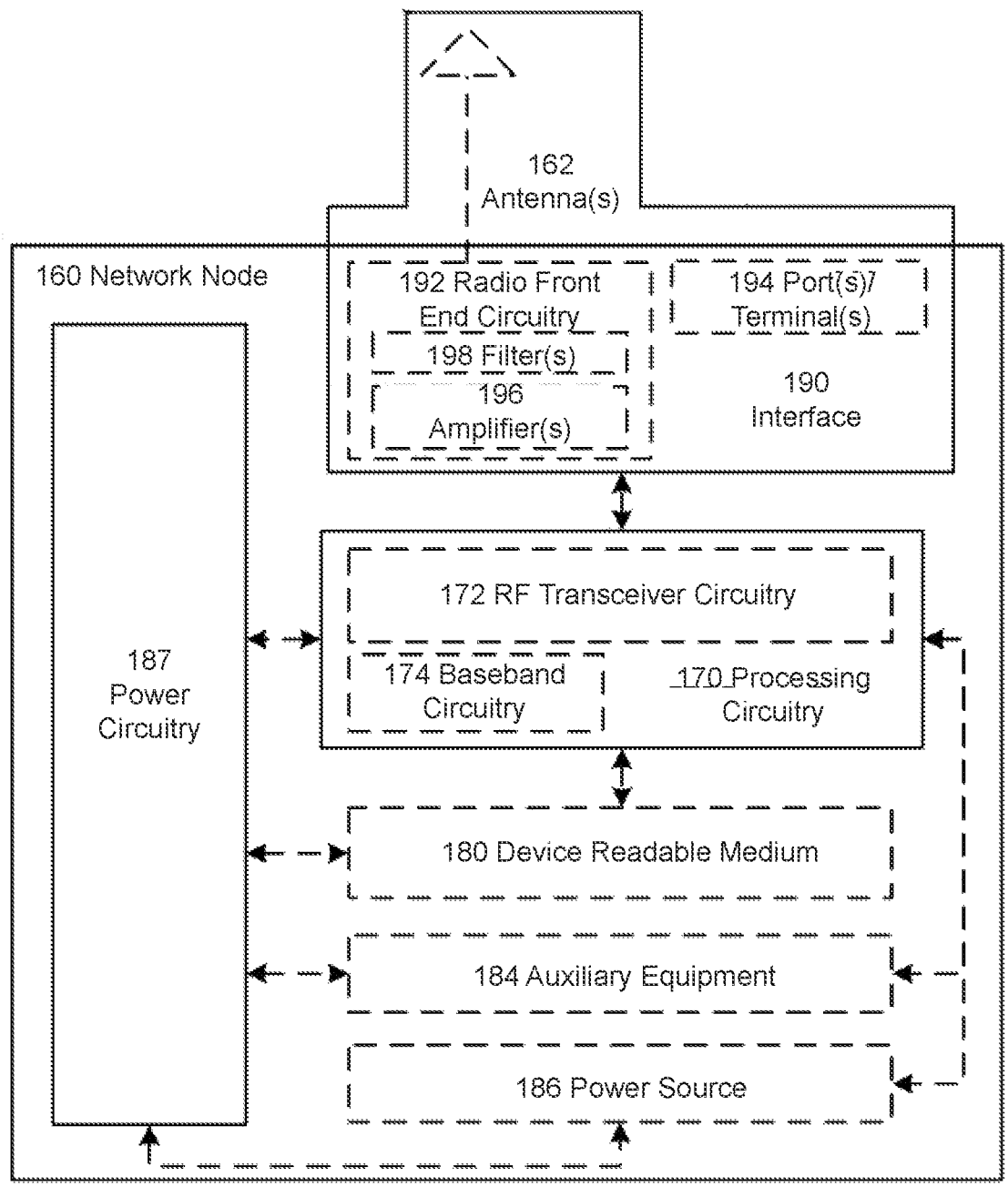
FIG. 9 illustrates an example network node, according to certain embodiments.

FIG. 9 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and New Radio (NR) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, Mobility Management Entities (MMEs)), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 10:
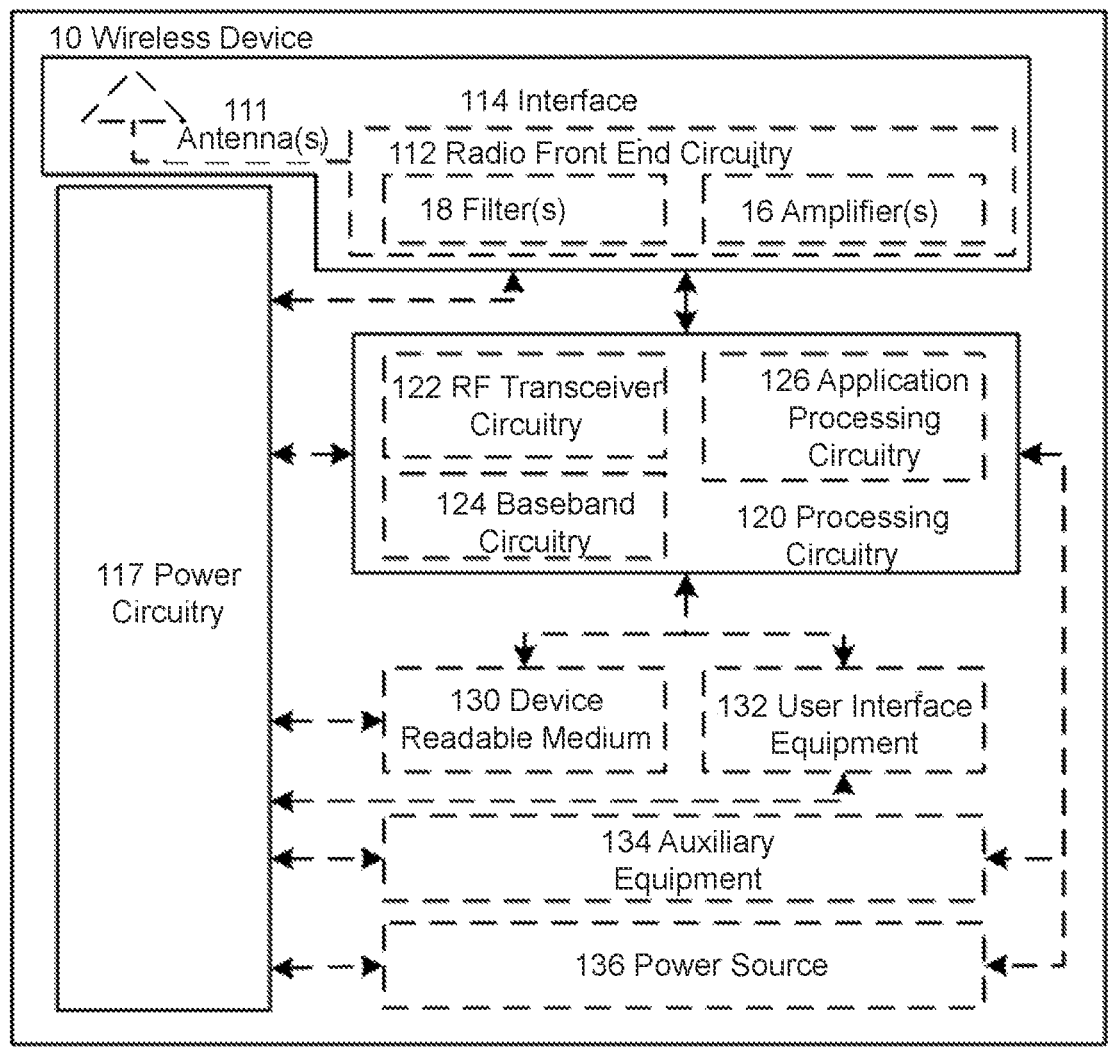
FIG. 10 illustrates an example wireless device, according to certain embodiments.

FIG. 10 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 11:
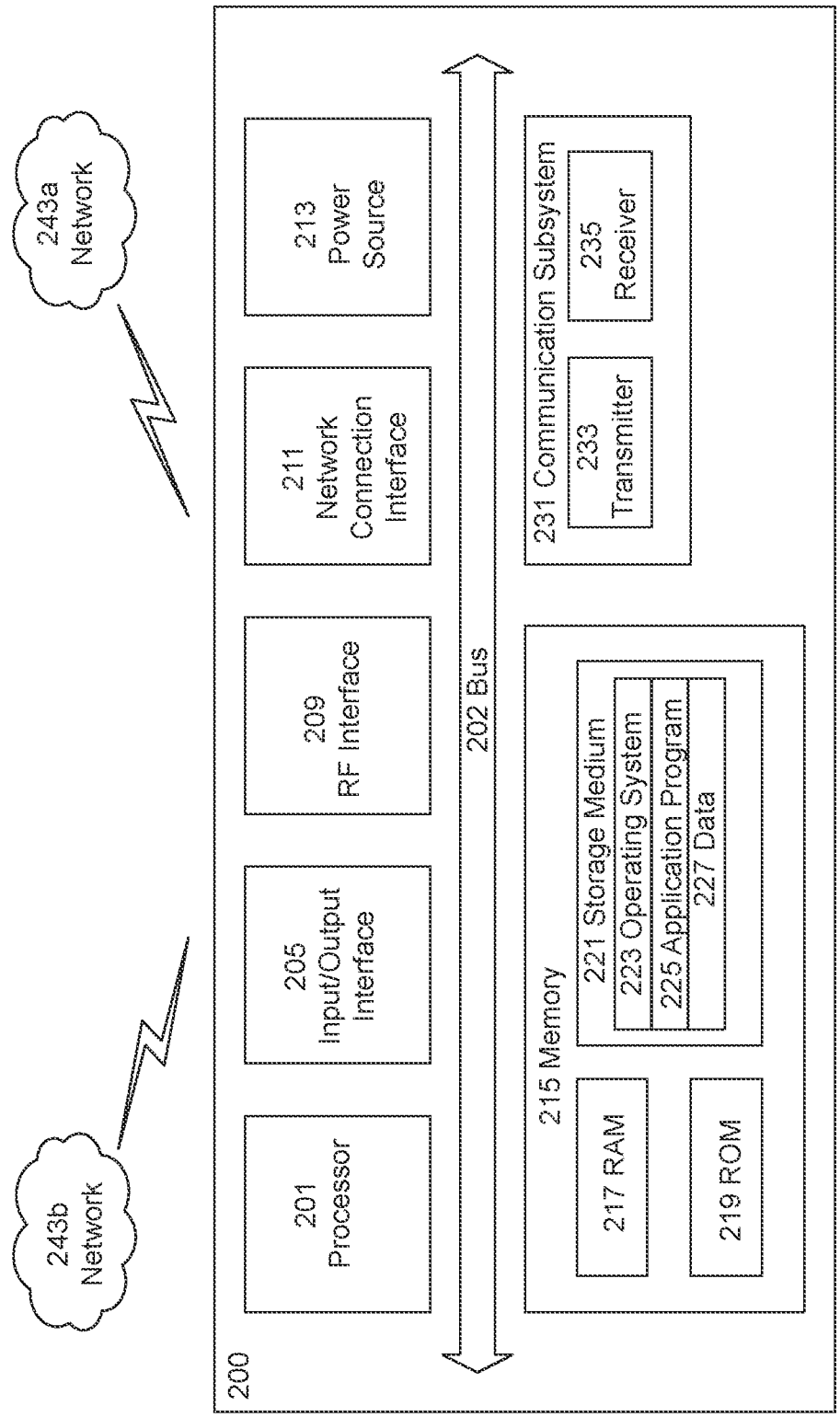
FIG. 11 illustrate an example user equipment, according to certain embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 11 is a UE, the components discussed herein are equally applicable to a wireless device, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
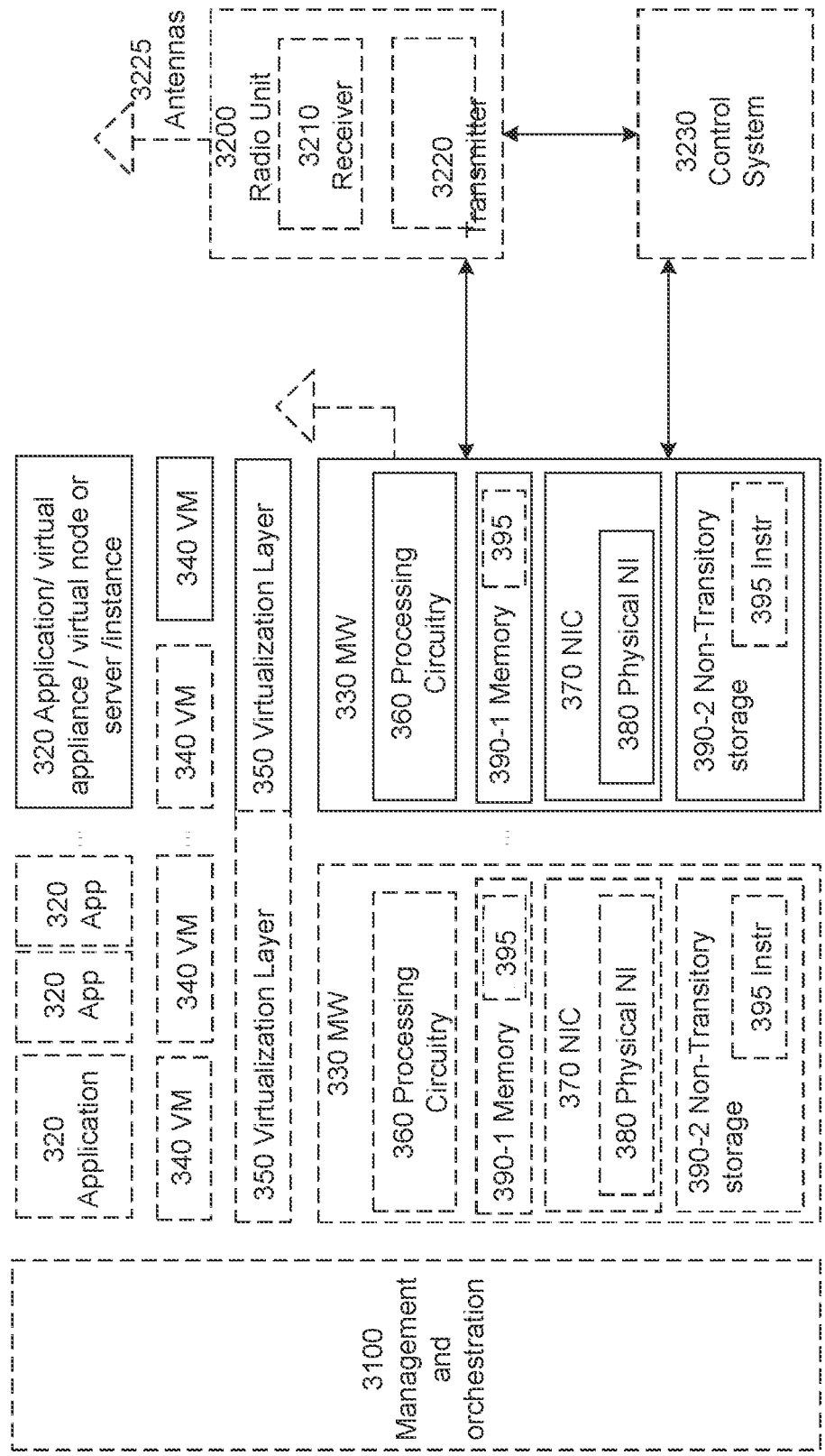
FIG. 12 illustrates a virtualization environment in which functions implemented by some embodiments may be virtualized, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 12.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 13:
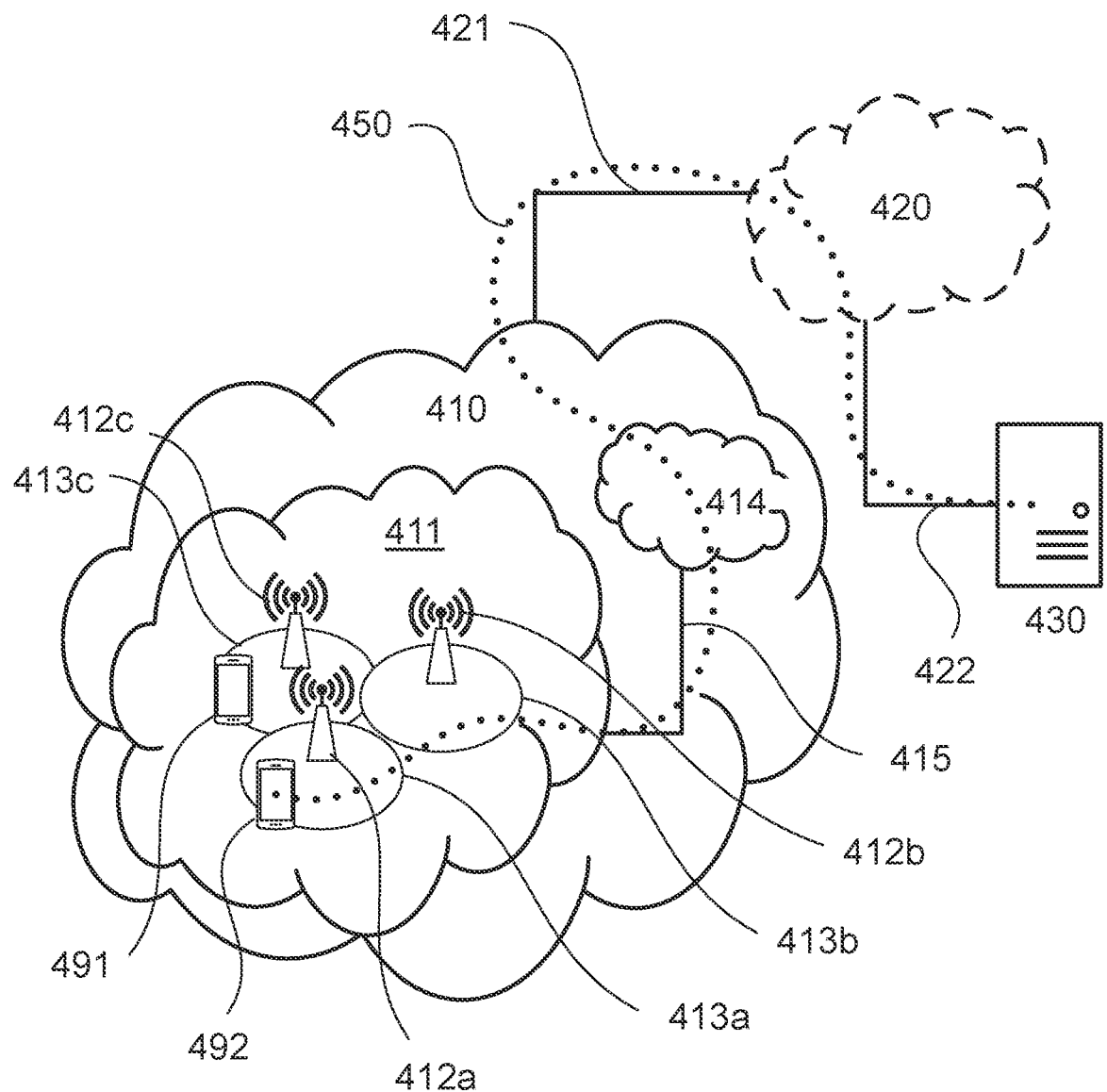
FIG. 13 illustrates a telecommunication network connected via an intermediate network to a host computer, according to certain embodiments.

FIG. 13 illustrates a telecommunication network connected via an intermediate network to a host computer in accordance with some embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
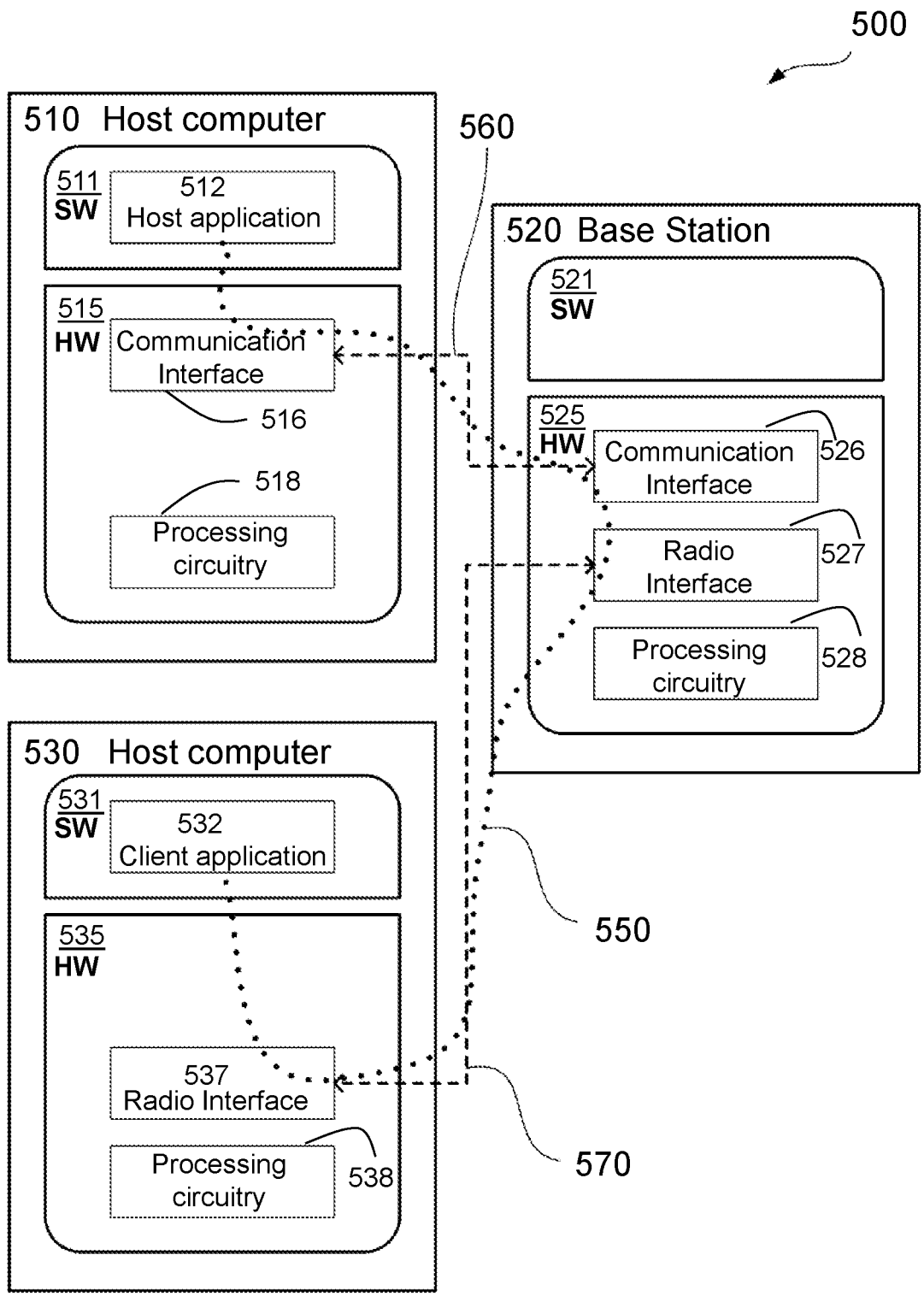
FIG. 14 illustrates a generalized block diagram of a host computer communicating via a base station with a user equipment over a partially wireless connection, according to certain embodiments.

FIG. 14 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 10, base station 520 and UE 530 illustrated in FIG. 14 may be similar or identical to host computer 430, one of base stations 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 5520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 17, 18:
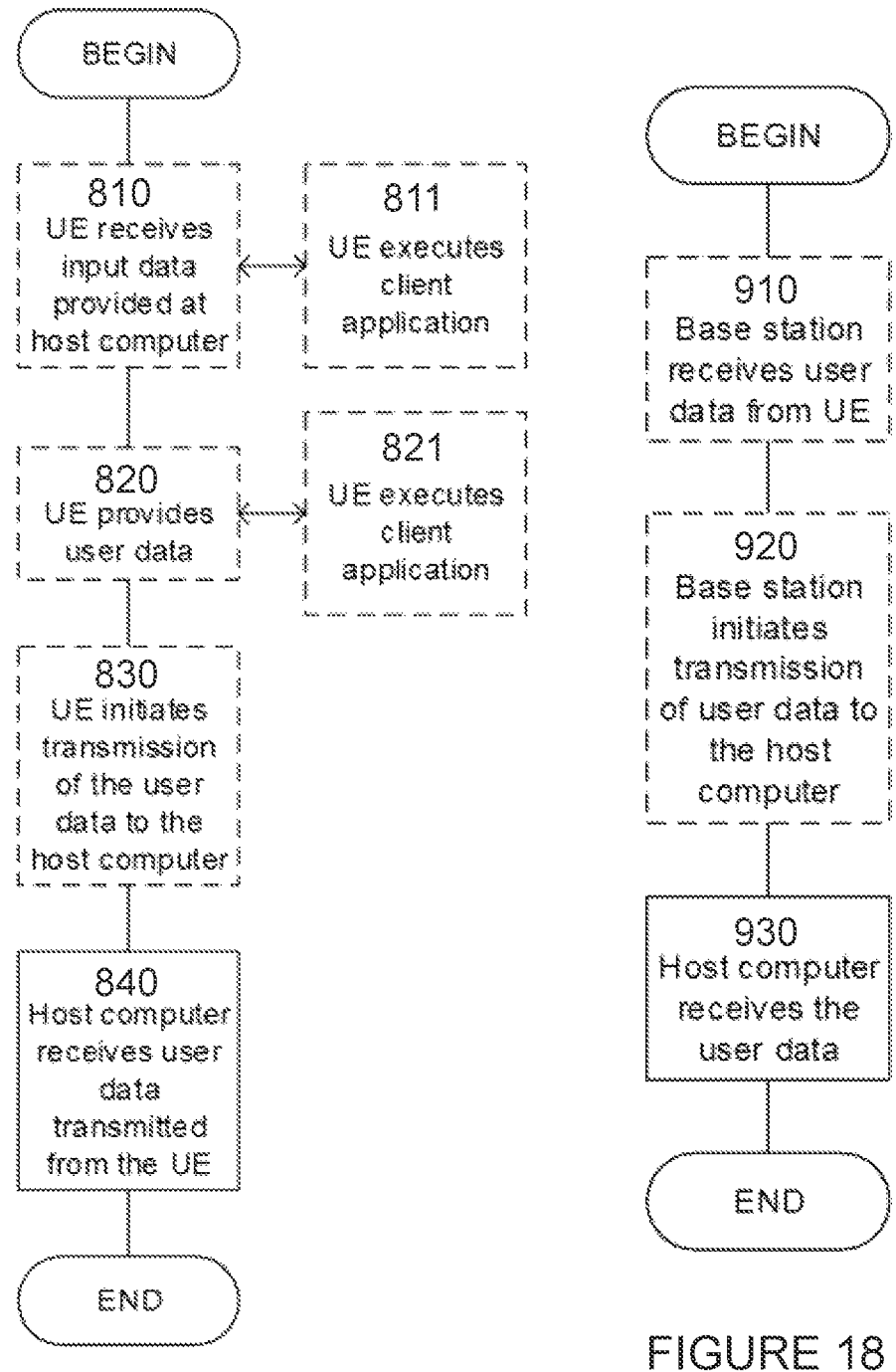
FIG. 17 illustrates another method implemented in a communication system, according to one embodiment.
FIG. 18 illustrates another method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 19:
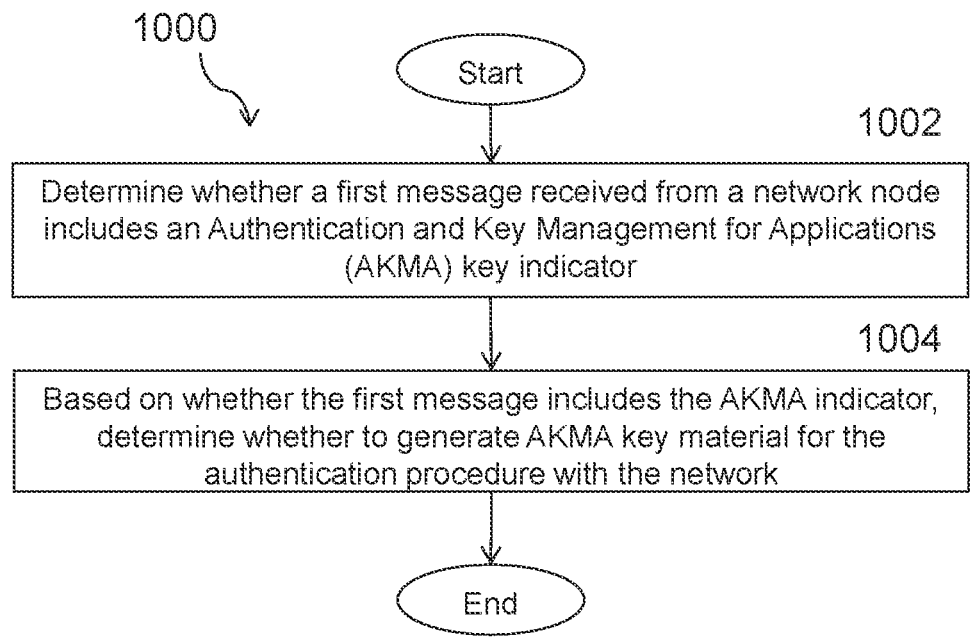
FIG. 19 illustrates an example method by a wireless device, according to certain embodiments.

FIG. 19 depicts a method 1000 by a wireless device 110, according to certain embodiments. At step 1002, the wireless device 110 determines whether a first message received from a network node 160 includes an AKMA key indicator. At step 1004, based on whether the first message includes the AKMA indicator, the wireless device 110 determines whether to generate AKMA key material for the authentication procedure with the network.

Figure 20:
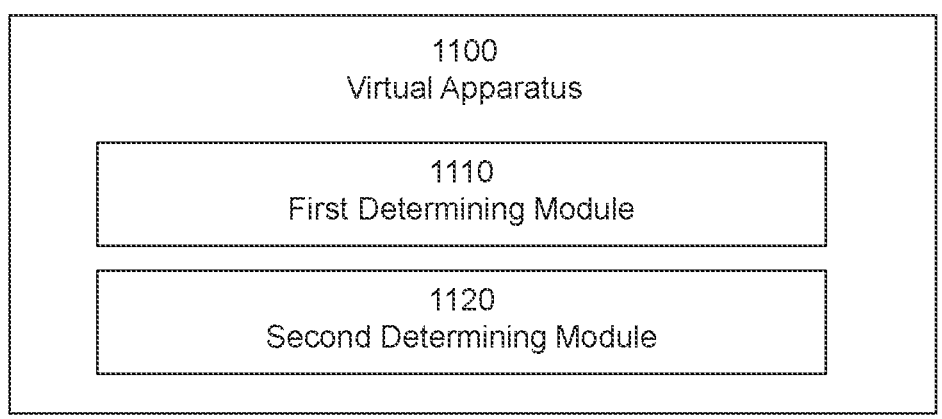
FIG. 20 illustrates an exemplary virtual computing device, according to certain embodiments.

FIG. 20 illustrates a schematic block diagram of a virtual apparatus 1100 in a wireless network (for example, the wireless network shown in FIG. 8). The apparatus may be implemented in a wireless device or network node (e.g., wireless device 110 or network node 160 shown in FIG. 8). Apparatus 1100 is operable to carry out the example method described with reference to FIG. 19 and possibly any other processes or methods disclosed herein. It is also to be understood that the method of FIG. 19 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining module 1110, second determining module 1120, and any other suitable units of apparatus 1100 to perform corresponding functions according one or more embodiments of the present disclosure.

According to certain embodiments, first determining module 1110 may perform certain of the determining functions of the apparatus 1100. For example, determining module 1110 may determine whether a first message received from a network node 160 includes an AKMA key indicator.

According to certain embodiments, second determining module 1120 may perform certain other of the determining functions of the apparatus 1100. For example, based on whether the first message includes the AKMA indicator, second determining module 1120 may determine whether to generate AKMA key material for the authentication procedure with the network.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 21:
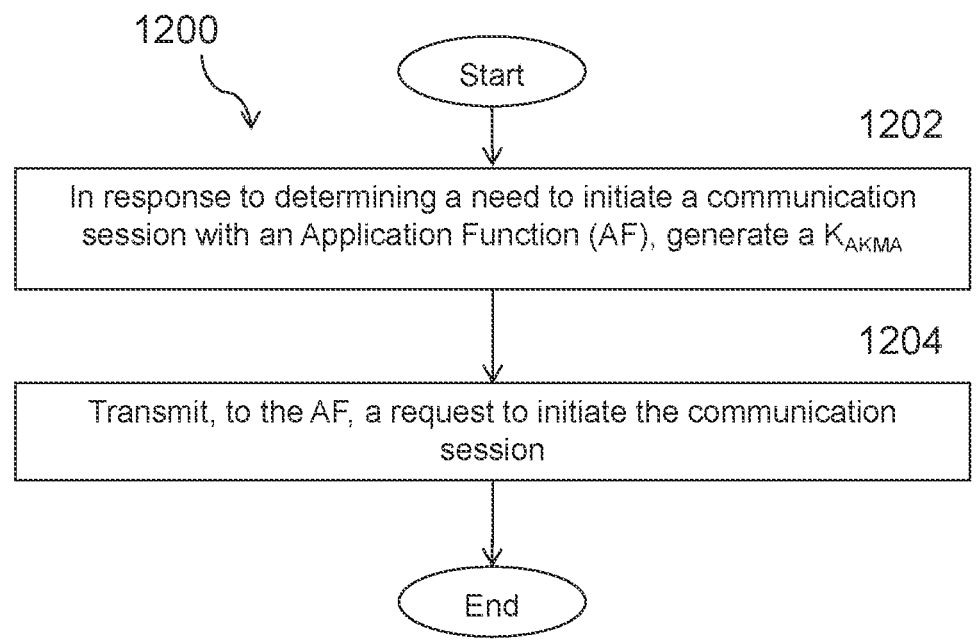
FIG. 21 illustrates an example method by a network node, according to certain embodiments.

FIG. 21 depicts a method 1200 by a wireless device 110, according to certain embodiments. At step 1202, in response to determining a need to initiate a communication session with an Application Function (AF), the wireless device 110 generates a $K_{AKMA}$. At step 1204, the wireless device 110 transmits, to the AF, a request to initiate the communication session.

In a particular embodiment, the need to initiate the communication session with the AF is determined after a performance of a primary authentication procedure with a network.

In a particular embodiment, during the performance of the primary authentication procedure, the wireless device 110 generates a root key, $K_{AUSF}$.

In a particular embodiment, the wireless device 110 generates the $K_{AKMA}$ and a $K_{AKMA}$ Identifier, $K_{AKMA}$ ID, based on the $K_{AUSF}$.

Figure 22:
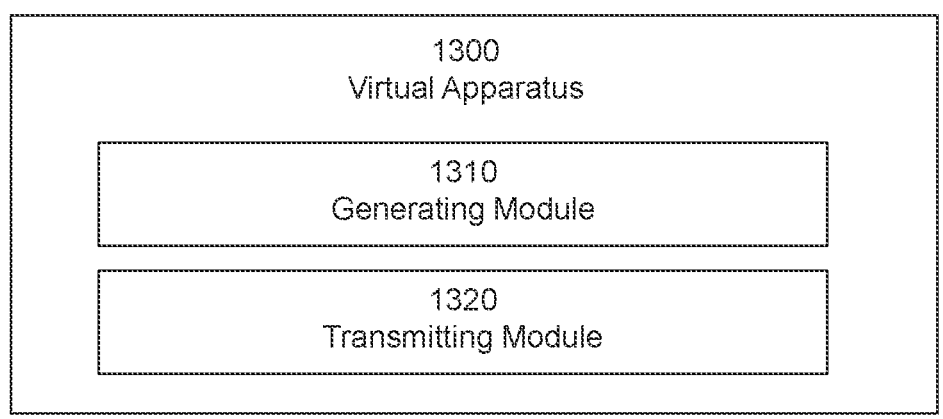
FIG. 22 illustrates another exemplary virtual computing device, according to certain embodiments.

In a particular embodiment, the wireless device 110 determines to generate a $K_{AKMA}$ based on subscription information stored in or at the wireless device 110. FIG. 22 illustrates a schematic block diagram of a virtual apparatus 1300 in a wireless network (for example, the wireless network shown in FIG. 8). The apparatus may be implemented in a wireless device or network node (e.g., wireless device 110 or network node 160 shown in FIG. 8). Apparatus 1300 is operable to carry out the example method described with reference to FIG. 21 and possibly any other processes or methods disclosed herein. It is also to be understood that the method of FIG. 21 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause generating module 1310, transmitting module 1320, and any other suitable units of apparatus 1300 to perform corresponding functions according one or more embodiments of the present disclosure.

According to certain embodiments, generating module 1310 may perform certain of the generating functions of the apparatus 1300. For example, in response to determining a need to initiate a communication session with an Application Function (AF), generating module 1310 may generate a $K_{AKMA}$.

According to certain embodiments, transmitting module 1320 may perform certain of the transmitting functions of the apparatus 1300. For example, transmitting module 1320 may transmit, to the AF, a request to initiate the communication session.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
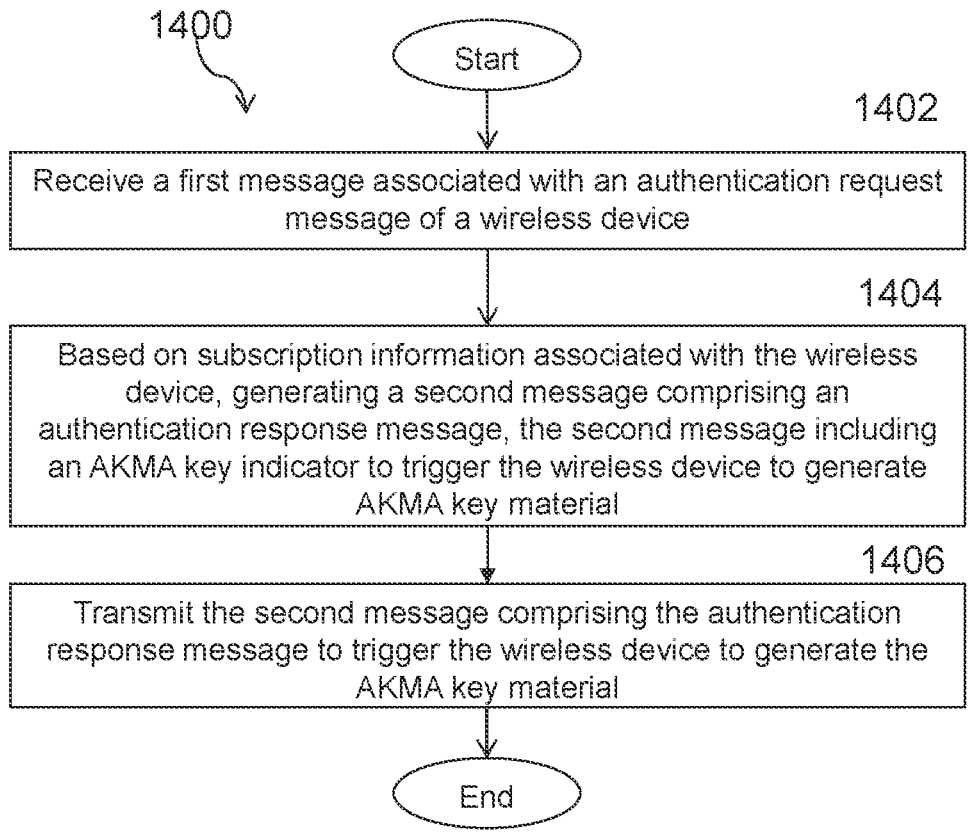
FIG. 23 illustrates another example method by a network node, according to certain embodiments.

FIG. 23 depicts a method 1400 by a network node 160 operating as a UDM, according to certain embodiments. At step 1402, the network node 160 receives a first message associated with an authentication request message of a wireless device 110. Based on subscription information associated with the wireless device 110, the network node 160 generates a second message comprising an authentication response message, at step 1404. The second message includes an AKMA key indicator to trigger the wireless device 110 to generate AKMA key material. At step 1406, the network node 160 transmits the second message comprising the authentication response message to trigger the wireless device 110 to generate the AKMA key material.

In a particular embodiment, the first message initiates an authentication procedure of a wireless device 110 with a network.

In a particular embodiment, the authentication procedure comprises a primary authentication procedure of the wireless device 110.

In a particular embodiment, the AKMA key indicator comprises a AKMA key material generation flag to trigger the wireless device 110 to generate the AKMA key material.

In a particular embodiment, the AKMA key material comprises an $K_{AKMA}$.

In a further particular embodiment, the AKMA key material comprises a $K_{AKMA}$ Identifier, $K_{AKMA}$ ID, and the $K_{AKMA}$ and the $K_{AKMA}$ID are derived based on a $K_{AUSF}$.

In a particular embodiment, the first message is received from a second network node 160 operating as an AUSF, and the second message is sent to the second network node 160 operating as the AUSF.

In a particular embodiment, prior to receiving the first message from the wireless device 110, the network node 160 receives a third message from a NF. The third message comprises the subscription information associated with the wireless device 110.

Figure 24:
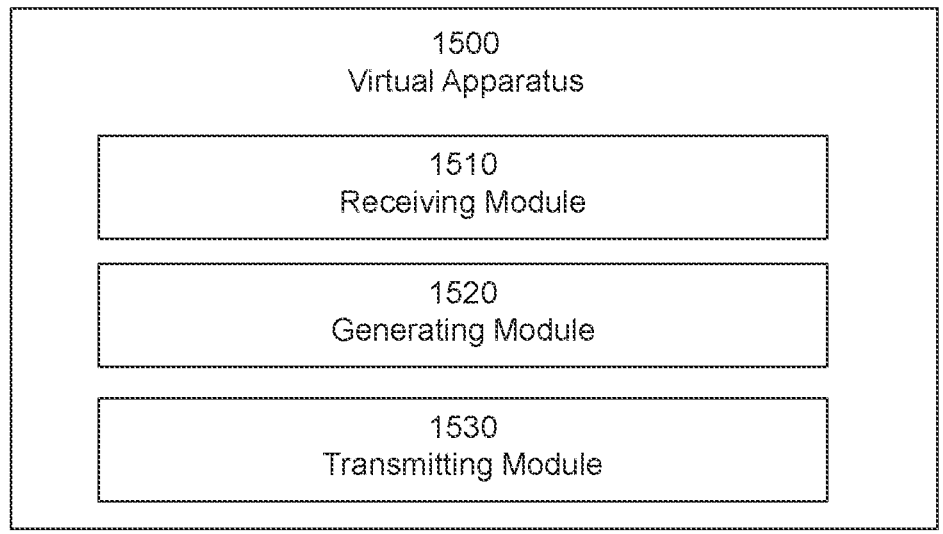
FIG. 24 illustrates another exemplary virtual computing device, according to certain embodiments.

FIG. 24 illustrates a schematic block diagram of a virtual apparatus 1500 in a wireless network (for example, the wireless network shown in FIG. 8). The apparatus may be implemented in a wireless device or network node (e.g., wireless device 110 or network node 160 shown in FIG. 8). Apparatus 1500 is operable to carry out the example method described with reference to FIG. 23 and possibly any other processes or methods disclosed herein. It is also to be understood that the method of FIG. 23 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510, generating module 1520, transmitting module 1530, and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive a first message associated with an authentication request message of a wireless device.

According to certain embodiments, generating module 1520 may perform certain of the generating functions of apparatus 1500. For example, generating module 1520 may generate a second message comprising an authentication response message, at step Q04. The second message includes an AKMA key indicator to trigger the wireless device to generate AKMA key material.

According to certain embodiments, transmitting module 1530 may perform certain of the transmitting functions of the apparatus 1500. For example, transmitting module 1520 may transmit the second message comprising the authentication response message to trigger the wireless device to generate the AKMA key material.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 25:
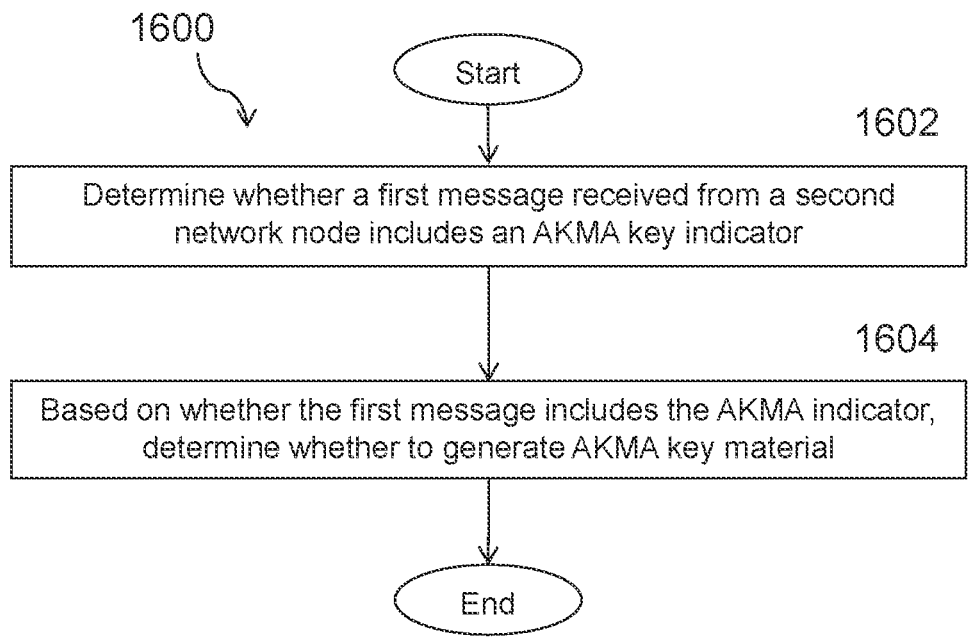
FIG. 25 illustrates another example method by a network node, according to certain embodiments.

FIG. 25 depicts a method 1600 by a network node 160 operating as a UDM, according to certain embodiments. At step 1602, the network node 160 determines whether a first message received from a network node 160 includes an AKMA key indicator. Based on whether the first message includes the AKMA indicator, the network node 160 determines whether to generate AKMA key material, at step 1604.

In a particular embodiment, when determining whether the first message comprises the AKMA key indicator, the network node 160 determines that the first message comprises the AKMA key indicator. The network node 160 then generates the AKMA key material based on the AKMA key indicator in the first message.

In another particular embodiment, when determining whether the first message comprises the AKMA key indicator, the network node 160 determines that the first message does not include the AKMA key indicator. The network node 160 then determines not to generate the AKMA key material for the authentication procedure with the network based on the first message not including the AKMA key indicator.

In a particular embodiment, the second network node 160 comprises a Unified Data Management, UDM, node.

In a particular embodiment, the network node 160 transmits a second message comprising the AKMA key indicator to a wireless device 110 to trigger the wireless device 110 to generate the AKMA key material.

In a particular embodiment, the AKMA key material comprises an Authentication and Key Management for Applications Anchor Key, $K_{AKMA}$.

In a further particular embodiment, the AKMA key material comprises a $K_{AKMA}$ID associated with a wireless device 110, and the $K_{AKMA}$ and the $K_{AKMA}$ID are derived based on a $K_{AUSF}$.

In a particular embodiment, the AKMA key indicator comprises an AKMA key material generation flag.

Figure 26:
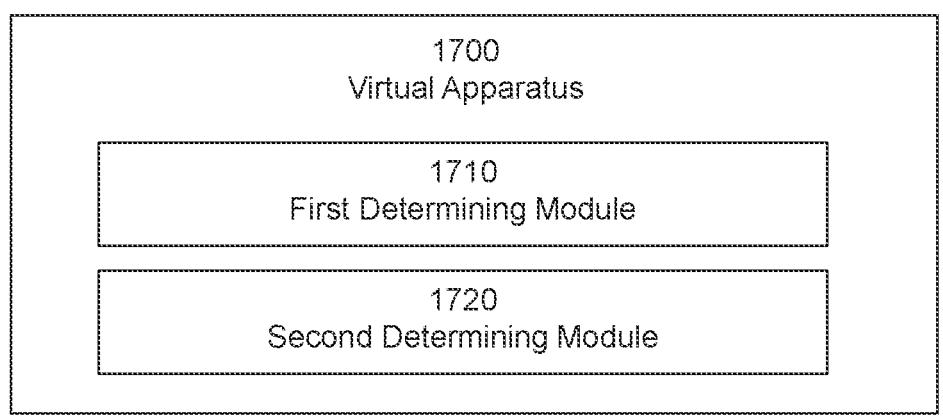
FIG. 26 illustrates another exemplary virtual computing device, according to certain embodiments.

FIG. 26 illustrates a schematic block diagram of a virtual apparatus 1700 in a wireless network (for example, the wireless network shown in FIG. 8). The apparatus may be implemented in a wireless device or network node (e.g., wireless device 110 or network node 160 shown in FIG. 8). Apparatus 1700 is operable to carry out the example method described with reference to FIG. 25 and possibly any other processes or methods disclosed herein. It is also to be understood that the method of FIG. 25 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining module 1710, second determining module 1720, and any other suitable units of apparatus 1700 to perform corresponding functions according one or more embodiments of the present disclosure.

According to certain embodiments, first determining module 1710 may perform certain of the determining functions of the apparatus 1700. For example, first determining module 1710 may determine whether a first message received from a network node includes an AKMA key indicator.

According to certain embodiments, second determining module 1720 may perform certain other of the determining functions of the apparatus 1700. For example, based on whether the first message includes the AKMA indicator, second determining module 1720 may determine whether to generate AKMA key material.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 27:
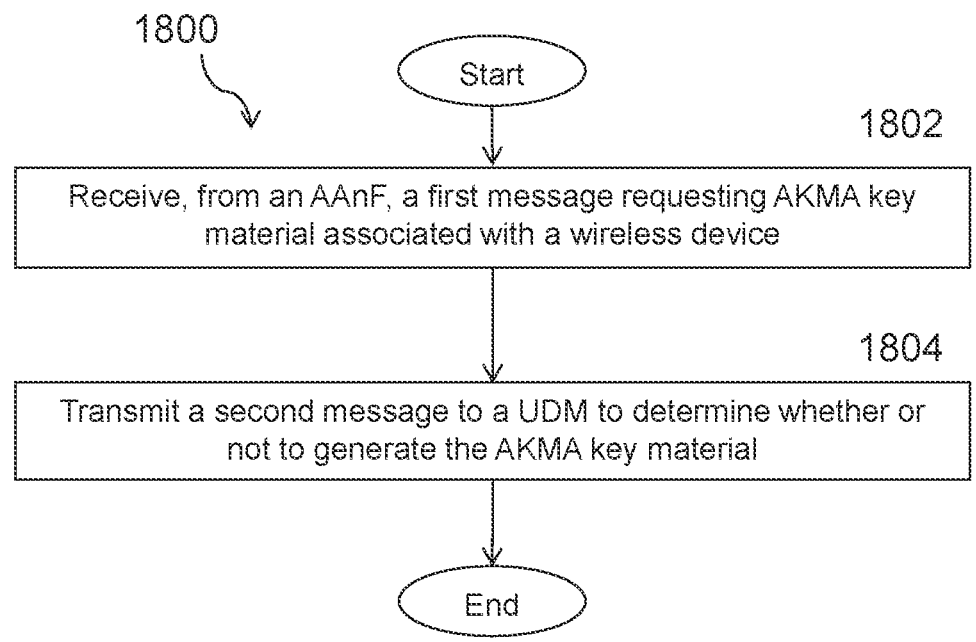
FIG. 27 illustrates another example method by a network node, according to certain embodiments.

FIG. 27 depicts a method 1800 by a network node 160 operating as an AUSF, according to certain embodiments. At step 1802, the network node 160 receives, from an AAnF, a first message requesting AKMA key material associated with a wireless device 110. At step 1804, the network node 160 transmits a second message to a UDM to determine whether or not to generate the AKMA key material.

Figure 28:
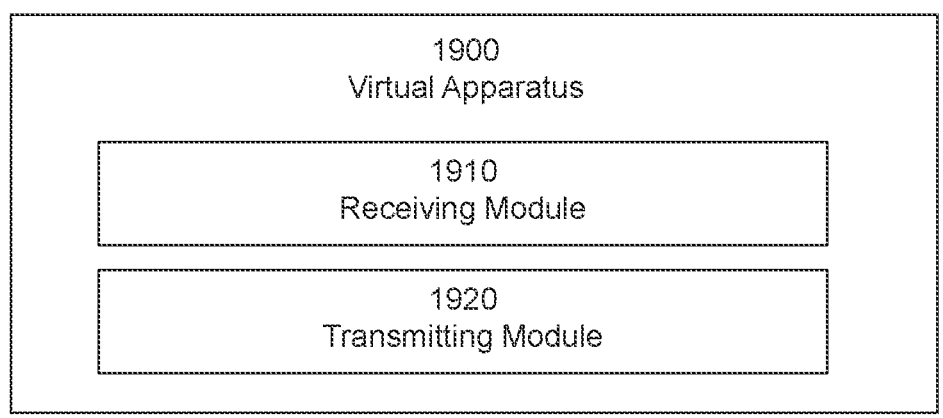
FIG. 28 illustrates another exemplary virtual computing device, according to certain embodiments.

FIG. 28 illustrates a schematic block diagram of a virtual apparatus 1900 in a wireless network (for example, the wireless network shown in FIG. 8). The apparatus may be implemented in a wireless device or network node (e.g., wireless device 110 or network node 160 shown in FIG. 8). Apparatus 1900 is operable to carry out the example method described with reference to FIG. 27 and possibly any other processes or methods disclosed herein. It is also to be understood that the method of FIG. 27 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1910, transmitting module 1920, and any other suitable units of apparatus 1900 to perform corresponding functions according one or more embodiments of the present disclosure.

According to certain embodiments, receiving module 1910 may perform certain of the receiving functions of the apparatus 1900. For example, receiving module 1910 may receive, from an AAnF, a first message requesting AKMA key material associated with a wireless device.

According to certain embodiments, transmitting module 1920 may perform certain of the transmitting functions of the apparatus 1900. For example, transmitting module 1920 may transmit a second message to a UDM to determine whether or not to generate the AKMA key material.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A1 Embodiments

Example Embodiment 1. A method performed by a wireless device, the method comprising: determining whether a first message received from a network node includes an Authentication and Key Management for Applications (AKMA) key indicator; and based on whether the first message includes the AKMA indicator, determining whether to generate AKMA key material for the authentication procedure with the network.

Example Embodiment 2. The method of Example Embodiment 1, further comprising: prior to receiving the first message from the network node, transmitting a second message to the network node, the second message initiating an authentication procedure with a network, and wherein the first message comprises an authentication response message.

Example Embodiment 3. The method of Example Embodiment 2, wherein the authentication procedure comprises a primary authentication procedure.

Example Embodiment 4. The method of Example Embodiment 1, wherein the first message is associated with a UE Parameter Update (UPU) procedure.

Example Embodiment 5. The method of any one of Example Embodiments 1 to 4, wherein the AKMA key indicator comprises an AKMA key material generation flag.

Example Embodiment 6. The method of any one of Example Embodiments 1 to 5, wherein determining whether the first message comprises the AKMA key indicator comprises: determining that the first message comprises the AKMA key indicator; and generating the AKMA key material based on the AKMA key indicator in the first message.

Example Embodiment 7. The method of any one of Example Embodiments 1 to 6, wherein determining whether the first message comprises the AKMA key indicator comprises: determining that the first message does not include the AKMA key indicator; and based on the first message not including the AKMA key indicator, determining not to generate the AKMA key material for the authentication procedure with the network.

Example Embodiment 8. The method of any one of Example Embodiments 1 to 7, wherein the wireless device determines whether to generate the AKMA key material based on subscription information stored in or at the wireless device.

Example Embodiment 9. The method of any one of Example Embodiments 1 to 8, wherein the network node comprises a Unified Data Management (UDM) node.

Example Embodiment 10. The method of any one of Example Embodiments 1 to 8, wherein the network node comprises a Authentication Server Function (AUSF).

Example Embodiment 11. The method of any one of Example Embodiments 1 to 10, wherein the AKMA key material comprises at least one of an anchor key ($K_{AKMA}$) and a $K_{AKMA}$ Identifier ($K_{AKMA}ID$).

Example Embodiment 12. A computer program comprising instructions which when executed on a computer perform any of the methods of Example Embodiments 1 to 11.

Example Embodiment 13. A computer program product comprising computer program, the computer program comprising instructions which when executed on a computer perform any of the methods of Example Embodiments 1 to 11.

Example Embodiment 14. A non-transitory computer readable medium storing instructions which when executed by a computer perform any of the methods of Example Embodiments 1 to 11.

Example Embodiment 15. A wireless device comprising processing circuitry configured to perform any of the methods of Example Embodiments 1 to 11.

Example Embodiment 16. A method performed by a wireless device, the method comprising: in response to determining a need to initiate a communication session with an Application Function (AF), generating a $K_{AKMA}$; and transmitting, to the AF, a request to initiate the communication session.

Example Embodiment 17. The method of Example Embodiment 16, wherein the need to initiate the communication session with the AF is determined after a performance of a primary authentication procedure with a network.

Example Embodiment 18. The method of Example Embodiment 17, further comprising: during the performance of the primary authentication procedure, generating a $K_{AUSF}$.

Example Embodiment 19. A computer program comprising instructions which when executed on a computer perform any of the methods of Example Embodiments 16 to 18.

Example Embodiment 20. A computer program product comprising computer program, the computer program comprising instructions which when executed on a computer perform any of the methods of Example Embodiments 16 to 18.

Example Embodiment 21. A non-transitory computer readable medium storing instructions which when executed by a computer perform any of the methods of Example Embodiments 16 to 18.

Example Embodiment 22. A wireless device comprising processing circuitry configured to perform any of the methods of Example Embodiments 16 to 18.

Example Embodiment 23. A method performed by a network node operating as a Unified Data Management (UDM) node, the method comprising: receiving a first message associated with an authentication request message of a wireless device; based on subscription information associated with the wireless device, generating a second message comprising an authentication response message, the second message including an Authentication and Key Management for Applications (AKMA) key indicator to trigger the wireless device to generate AKMA key material; and transmitting the second message comprising the authentication response message to trigger the wireless device to generate the AKMA key material.

Example Embodiment 24. The method of Example Embodiment 23, wherein the first message initiates an authentication procedure with a network.

Example Embodiment 25. The method of Example Embodiment 24, wherein the authentication procedure comprises a primary authentication procedure.

Example Embodiment 26. The method of any one of Example Embodiments 23 to 25, further comprising: prior to receiving the first message from the wireless device, receiving a third message from a NF, the third message comprising the subscription information associated with the wireless device.

Example Embodiment 27. The method of any one of Example Embodiments 23 to 26, wherein the AKMA key indicator comprises a AKMA key material generation flag to trigger the wireless device is to generate the AKMA key material.

Example Embodiment 28. The method of any one of Example Embodiments 23 to 27 wherein the AKMA key material comprises an anchor key ($K_{AKMA}$).

Example Embodiment 29. A computer program comprising instructions which when executed on a computer perform any of the methods of Example Embodiments 23 to 28.

Example Embodiment 30. A computer program product comprising computer program, the computer program comprising instructions which when executed on a computer perform any of the methods of Example Embodiments 23 to 28.

Example Embodiment 31. A network node comprising processing circuitry configured to perform any of the method of Example Embodiments 23 to 28.

Example Embodiment 32. A method performed by a network node, the method comprising: determining whether a first message received from a network node includes an Authentication and Key Management for Applications (AKMA) key indicator; and based on whether the first message includes the AKMA indicator, determining whether to generate AKMA key material.

Example Embodiment 33. The method of any one of Example Embodiments 33, wherein the AKMA key indicator comprises an AKMA key material generation flag.

Example Embodiment 34. The method of any one of Example Embodiments 32 to 33, wherein determining whether the first message comprises the AKMA key indicator comprises: determining that the first message comprises the AKMA key indicator; and generating the AKMA key material based on the AKMA key indicator in the first message.

Example Embodiment 35. The method of any one of Example Embodiments 32 to 33, wherein determining whether the first message comprises the AKMA key indicator comprises: determining that the first message does not include the AKMA key indicator; and based on the first message not including the AKMA key indicator, determining not to generate the AKMA key material for the authentication procedure with the network.

Example Embodiment 36. The method of any one of Example Embodiments 32 to 35, wherein the network node comprises a Unified Data Management (UDM) node.

Example Embodiment 37. The method of any one of Example Embodiments 32 to 35, wherein the network node comprises a Authentication Server Function (AUSF).

Example Embodiment 38. A method performed by a network node operating as an AUSF, the method comprising: receiving, from an Authentication and Key Management for Applications Application Function (AAnF), a first message requesting Authentication and Key Management for Applications (AKMA) key material associated with a wireless device; and transmitting a second message to a Unified Data Management (UDM) to determine whether or not to generate the AKMA key material.

Example Embodiment 39. The method of Example Embodiment 38, wherein the first message comprises a $K_{AKMA}$ Identifier ($K_{AKMA}$ID) associated with the wireless device.

Example Embodiment 40. The method of any one of Example Embodiments 38 to 39, wherein the $K_{AKMA}$ ID is derived based on the $K_{AKMA}$.

Example Embodiment 41. The method of anyone of Example Embodiments 38 to 40, further comprising: receiving a third message from the UDM, the third message comprising an AKMA key indicator; and based on receiving the third message comprising the AKMA key indicator, generating the AKMA key material.

Example Embodiment 42. The method of any one of Example Embodiments 38 to 40, further comprising: receiving a third message from the UDM, the third message indicating that the AUSF is not to generate the AKMA key material; and based on receiving the third message, determining not to generate the AKMA key material.

Example Embodiment 43. The method of any one of Example Embodiments 38 to 40, further comprising: receiving a third message from the UDM; determining that the third message from the UDM does not include an AKMA key indicator; and based on the third message not including the AKMA key indicator, determining not to generate the AKMA key material.

Example Embodiment 44. The method of any one of Example Embodiments 38 to 40, further comprising: receiving a third message from the UDM, the third message comprising the AKMA key material.

Example Embodiment 45. The method of any one of Example Embodiments 38 to 44, wherein a determination as to whether to generate the AKMA key material is at least partially based on subscription information associated with the wireless device.

Example Embodiment 46. The method of any one of Example Embodiments 38 to 45, further comprising generating a $K_{AUSF}$ during a primary authentication procedure with the wireless device.

Example Embodiment 47. A computer program comprising instructions which when executed on a computer perform any of the methods of Example Embodiments 38 to 46.

Example Embodiment 48. A computer program product comprising computer program, the computer program comprising instructions which when executed on a computer perform any of the methods of Example Embodiments 38 to 46.

Example Embodiment 49. A non-transitory computer readable medium storing instructions which when executed by a computer perform any of the methods of Example Embodiments 38 to 46.

Example Embodiment 50. A wireless device comprising processing circuitry configured to perform any of the methods of Example Embodiments 38 to 46.

Example Embodiment 51. A wireless device comprising: processing circuitry configured to perform any of the steps of any of Example Embodiments 1 to 22; and power supply circuitry configured to supply power to the wireless device.

Example Embodiment 52. A network node comprising: processing circuitry configured to perform any of the steps of any of Example Embodiments 23 to 50; power supply circuitry configured to supply power to the wireless device.

Example Embodiment 53. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 22; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 54. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of Example Embodiments 23 to 50.

Example Embodiment 55. The communication system of the pervious Example Embodiment further including the network node.

Example Embodiment 56. The communication system of the previous 2 Example Embodiments, further including the wireless device, wherein the wireless device is configured to communicate with the network node.

Example Embodiment 57. The communication system of the previous 3 Example Embodiments, wherein: the processing circuitry of the host computer is configured to execute a host application, thereby providing the user data; and the wireless device comprises processing circuitry configured to execute a client application associated with the host application.

Example Embodiment 58. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of Example Embodiments 23 to 50.

Example Embodiment 59. The method of the previous Example Embodiment, further comprising, at the network node, transmitting the user data.

Example Embodiment 60. The method of the previous 2 Example Embodiments, wherein the user data is provided at the host computer by executing a host application, the method further comprising, at the wireless device, executing a client application associated with the host application.

Example Embodiment 61. A wireless device configured to communicate with a network node, the wireless device comprising a radio interface and processing circuitry configured to performs the of the previous 3 Example Embodiments.

Example Embodiment 62. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of Example Embodiments 1 to 22.

Example Embodiment 63. The communication system of the previous Example Embodiment, wherein the cellular network further includes a network node configured to communicate with the wireless device.

Example Embodiment 64. The communication system of the previous 2 Example embodiments, wherein: the processing circuitry of the host computer is configured to execute a host application, thereby providing the user data; and the wireless device's processing circuitry is configured to execute a client application associated with the host application.

Example Embodiment 65. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of Example Embodiments 1 to 22.

Example Embodiment 66. The method of the previous Example Embodiment, further comprising at the wireless device, receiving the user data from the network node.

Example Embodiment 67. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of Example Embodiments 1 to 22.

Example Embodiment 68. The communication system of the previous Example Embodiment, further including the wireless device.

Example Embodiment 69. The communication system of the previous 2 Example Embodiments, further including the network node, wherein the network node comprises a radio interface configured to communicate with the wireless device and a communication interface configured to forward to the host computer the user data carried by a transmission from the wireless device to the network node.

Example Embodiment 70. The communication system of the previous 3 Example Embodiments, wherein: the processing circuitry of the host computer is configured to execute a host application; and the wireless device's processing circuitry is configured to execute a client application associated with the host application, thereby providing the user data.

Example Embodiment 71. The communication system of the previous 4 Example Embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 72. A method implemented in a communication system including a host computer, a network node and a wireless device, the method comprising: at the host computer, receiving user data transmitted to the network node from the wireless device, wherein the wireless device performs any of the steps of any of Example Embodiments 1 to 22.

Example Embodiment 73. The method of the previous Example Embodiment, further comprising, at the wireless device, providing the user data to the network node.

Example Embodiment 74. The method of the previous 2 Example Embodiments, further comprising: at the wireless device, executing a client application, thereby providing the user data to be transmitted; and at the host computer, executing a host application associated with the client application.

Example Embodiment 75. The method of the previous 3 Example Embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 76. A communication system including a host computer comprising a communication interface configured to receive user data originating from a transmission from a wireless device to a network node, wherein the network node comprises a radio interface and processing circuitry, the network node's processing circuitry configured to perform any of the steps of any of Example Embodiments 23 to 50.

Example Embodiment 77. The communication system of the previous Example Embodiment further including the network node.

Example Embodiment 78. The communication system of the previous 2 Example Embodiments, further including the wireless device, wherein the wireless device is configured to communicate with the network node.

Example Embodiment 79. The communication system of the previous 3 Example Embodiments, wherein: the processing circuitry of the host computer is configured to execute a host application; the wireless device is configured to execute a client application associated with the host application, thereby providing the user data to be received by the host computer.

Example Embodiment 80. A method implemented in a communication system including a host computer, a network node and a wireless device, the method comprising: at the host computer, receiving, from the base station, user data originating from a transmission which the network node has received from the wireless device, wherein the wireless device performs any of the steps of any of Example Embodiments 1 to 22.

Example Embodiment 81. The method of the previous Example Embodiment, further comprising at the network node receiving the user data from the wireless device.

Example Embodiment 82. The method of the previous 2 Example Embodiments, further comprising at the network node, initiating a transmission of the received user data to the host computer.

Example Embodiment 83. The method of any of the previous Example Embodiments, wherein the network node comprises a base station.

Example Embodiment 84. The method of any of the previous Example Embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A host computer, comprising:

processing circuitry configured to provide user data; and a communication interface configured to forward the user data to a cellular network for transmission to a user equipment (UE), wherein the cellular network comprises a network node configured to perform operations, comprising:

determining whether a first message received from a network node includes an Authentication and Key Management for Applications (AKMA) key indicator; and based on whether the first message includes the AKMA indicator, determining whether to generate AKMA key material, wherein determining whether the first message comprises the AKMA key indicator comprises:

determining that the first message does not include the AKMA key indicator; and based on the first message not including the AKMA key indicator, determining not to generate the AKMA key material for the authentication procedure with the network.

2. The host computer of claim 1, wherein the AKMA key indicator comprises an AKMA key material generation flag.

3. The host computer of claim 1, wherein determining whether the first message comprises the AKMA key indicator comprises:

determining that the first message comprises the AKMA key indicator; and generating the AKMA key material based on the AKMA key indicator in the first message.

4. A non-transitory computer readable medium comprising instructions that, when executed by a processor in a host computer of a communication system, cause the host computer to perform operations comprising:
providing user data; and
forwarding the user data to a cellular network, via a communication interface, for transmission to a user equipment (UE), wherein the cellular network comprises a network node configured to perform operations, comprising:
determining whether a first message received from a network node includes an Authentication and Key Management for Applications (AKMA) key indicator; and
based on whether the first message includes the AKMA indicator, determining whether to generate AKMA key material,
wherein determining whether the first message comprises the AKMA key indicator comprises:
determining that the first message does not include the AKMA key indicator; and
based on the first message not including the AKMA key indicator, determining not to generate the AKMA key material for the authentication procedure with the network.

5. The non-transitory computer readable medium of claim 4, wherein the AKMA key indicator comprises an AKMA key material generation flag.

6. The non-transitory computer readable medium of claim 4, wherein determining whether the first message comprises the AKMA key indicator comprises:
determining that the first message comprises the AKMA key indicator; and
generating the AKMA key material based on the AKMA key indicator in the first message.

7. A method in a host computer of a communication system, comprising:
providing user data; and
forwarding the user data to a cellular network, via a communication interface, for transmission to a user equipment (UE), wherein the cellular network comprises a network node configured to perform operations, comprising:
determining whether a first message received from a network node includes an Authentication and Key Management for Applications (AKMA) key indicator; and
based on whether the first message includes the AKMA indicator, determining whether to generate AKMA key material,
wherein determining whether the first message comprises the AKMA key indicator comprises:
determining that the first message does not include the AKMA key indicator; and
based on the first message not including the AKMA key indicator, determining not to generate the AKMA key material for the authentication procedure with the network.

8. The method of claim 7, wherein the AKMA key indicator comprises an AKMA key material generation flag.

9. The method of claim 7, wherein determining whether the first message comprises the AKMA key indicator comprises:
determining that the first message comprises the AKMA key indicator; and
generating the AKMA key material based on the AKMA key indicator in the first message.

* * * * *